US008063896B2

(12) United States Patent
Nishimura

(10) Patent No.: US 8,063,896 B2

(45) Date of Patent: Nov. 22, 2011

(54) LIQUID CRYSTAL DISPLAY DEVICE, SOURCE DRIVER, AND METHOD OF DRIVING A LIQUID CRYSTAL DISPLAY PANEL

(75) Inventor: Kouichi Nishimura, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 942 days.

(21) Appl. No.: 12/010,840

(22) Filed: Jan. 30, 2008

(65) Prior Publication Data

US 2008/0180427 A1 Jul. 31, 2008

(30) Foreign Application Priority Data

Jan. 31, 2007 (JP) ................................. 2007-021110

(51) Int. Cl.
*G06F 3/038* (2006.01)
*G09G 5/00* (2006.01)

(52) U.S. Cl. .............. 345/209; 345/53; 345/94; 345/96; 345/204; 345/208

(58) Field of Classification Search ........................ None
See application file for complete search history.

(56) References Cited

U.S. PATENT DOCUMENTS 6,587,089 B1 * 7/2003 Nakajima ....................... 345/99
6,707,442 B2 3/2004 Watanabe
2002/0041274 A1 * 4/2002 Watanabe ..................... 345/204
2002/0075212 A1 6/2002 Song
2004/0070581 A1 * 4/2004 Hiraki et al. .................. 345/209
2004/0108988 A1 * 6/2004 Choi .............................. 345/96
2004/0222954 A1 * 11/2004 Lueder ............................ 345/87
2006/0017680 A1 * 1/2006 Chen et al. ...................... 345/96
2006/0022927 A1 * 2/2006 Woo et al. ....................... 345/89

FOREIGN PATENT DOCUMENTS

JP 11-249623 9/1999
JP 11-249623 A 9/1999
JP 11-305735 11/1999
JP 11-305735 A 11/1999
JP 2002-108303 4/2002

OTHER PUBLICATIONS

Office Action for U.S. Appl. No. 12/000,613 dated Nov. 15, 2010.
Office Action for U.S. Appl. No. 12/000,613 dated Dec. 6, 2010.

* cited by examiner

*Primary Examiner* — Ke Xiao
*Assistant Examiner* — Jesus Hernandez
(74) *Attorney, Agent, or Firm* — McGinn IP Law Group, PLLC

(57) ABSTRACT

A source driver which can control the spatial cycle of inverting the polarity of offset voltage in response to the spatial cycle of inverting the polarity of data signal. The liquid crystal display device according to the present invention has an LCD panel, having data lines, and source drivers for supplying data signal to the data lines. The source driver includes an offset cancel control circuit for generating an offset cancel control signal and an amplifier used for generating the data signal, which is configured so as to invert the polarity of the offset voltage in response to the offset cancel control signal OCC. The offset cancel controller circuit receives the pattern select signal PSEL specifying the cycle of inverting the polarity of the offset voltage of the amplifier to generate the offset cancel control signal in response to the pattern select signal PSEL.

12 Claims, 15 Drawing Sheets

LIQUID CRYSTAL DISPLAY DEVICE, SOURCE DRIVER, AND METHOD OF DRIVING A LIQUID CRYSTAL DISPLAY PANEL

FIELD OF THE INVENTION

The present invention is related in a liquid crystal display device, a source driver, and a method of driving a liquid crystal display panel. In particular, the present invention is related to a technology for suppressing the degrayscale of image quality of display image caused by the offset voltage of an amplifier integrated in the driver of the liquid crystal display panel.

BACKGROUND OF THE INVENTION

One of technologies most commonly used in driving a liquid crystal display panel is the inverted drive. The inverted drive is a method of driving the liquid crystal display panel, in order to prevent a so-called burning phenomenon, by inverting the polarity of data signals to be supplied in the data lines (signal lines) in a predetermined spatial cycle and in a predetermined temporal cycle. It should be noted here that in the present specification the polarity of data signal is define based on the reference to the voltage level in a common electrode in a liquid crystal display panel (the common voltage). If a given data signal has a signal level higher than the common voltage Vcom, the polarity of that data signal is defined as “positive”. On contrary, if a given data signal has a signal level lower than the common voltage Vcom, then the polarity of the data signal is defined as “negative”. The inverted drive is devised to effectively prevent the burning by decreasing the DC component of the voltage applied to the liquid crystal capacity of a pixel.

The period of cycling time for the polarity of the data signal to be inverted in the inverted drive may be selected in a various manner. In the most typical inverted drive, referred to as the dot inverted drive, a data signal having an inverted polarity is written in the adjoining pixels, both in horizontal direction and in vertical direction. More specifically, in the dot inverted drive, both in the horizontal direction and in the vertical direction, the polarity of the data signal is inverted for every one pixel. When driving a large scaled liquid crystal display panel, the polarity of the data signal is inverted for every one pixel in the horizontal direction, while on the other hand the polarity of the data signal is often inverted for every two pixels in the vertical direction. In the present specification, the type of inverted drive where the cycle for the plurality of the data signal to be inverted in the vertical direction is the number alpha pixels will be referred to as alpha H inverted drive. For instance the inverted drive method for inverting the polarity of the data signal for every one pixel in the vertical direction (as is done in the dot inverted drive) will be described as the 1H inverted drive, and the inverted drive method for inverting the polarity of the data signal in the vertical direction for every two pixels will be described as the 2H inverted drive.

The data signal in general is generated as follows. In the driver for generating the data signal (often referred to as a source driver), a grayscale voltage generator circuit, a D/A converter and a power amplifier are integrated. The grayscale voltage generator circuit generates one set of grayscale voltages having voltage levels each corresponding to a grayscale that a pixel may be set. The D/A converter selects a desired grayscale voltage in response to the display data from within the one set of grayscale voltages, and outputs thus selected grayscale voltage to the power amplifier. The display data in the present context is the data indicative of the grayscale of the pixel to be driven. The power amplifier outputs to the data line the data signal having the same voltage level as the grayscale voltage supplied from the D/A converter. In most of cases, for the power amplifier, a differential amplifier having the output from the output stage connected to one of two inputs in the input differential stage, or a voltage follower, is used.

In general, to generate the grayscale voltage in the grayscale voltage generator circuit, a resistance ladder together with an amplifier (an op-amplifier) for supplying the bias voltage to the ladder is used. By dividing the bias voltage by means of the resistance ladder one set of grayscale voltages may be generated. Since the bias voltage output from the amplifier connected to the resistance ladder is determined so as to be at the voltage level that the grayscale voltage reflects the gamma curve of the liquid crystal display panel, the amplifier to be connected to the resistance ladder is often referred to as a gamma amplifier. A voltage follower may be often used for the gamma amplifier.

One difficulty seen in the driver of a liquid crystal display panel is such that the amplifier integrated therein has an offset voltage; therefore the voltage actually output from the amplifier may or may not be different from the desired voltage. For example, when an offset voltage is present in the power amplifier, the voltage level of the data signal may be deviated from the desired level, as a result the voltage to be written in a pixel will also be deviated from the desired level. Consequently the actual grayscale expressed by the pixel will be differed from the desired grayscale, and eventually the image quality of the image will be degraded. In particular, the offset problem may be worsening if the offset voltage is not constant from one amplifier to another. The inconsistency of the offset voltage will be recognized by the naked human eye as the vertical striping irregularity extending in the direction of the data line. In a same manner if there is present an offset voltage in the gamma amplifier, then the actual grayscale expressed by the pixel may be deviated from the desired grayscale so that the image quality of the image will be degraded.

One effective approach to avoid the problem of the offset voltage in the amplifier is to invert the polarity of the offset voltage at an appropriate cycle. It is worth noting here that the polarity of the offset voltage in the present specification is the relationship between the voltage expected to be output from the amplifier (hereinafter, “desired voltage”), and the voltage actually output from the amplifier (hereinafter “actual voltage”), and that the concept is different from the polarity of the data signal. By inverting the polarity of the offset voltage at an appropriate cycle, it may be possible for the influence of the offset voltage not to be recognized by the naked human eye. In the following description, the polarity of the offset voltage is defined as “positive” when the actual voltage is higher than the desired voltage; the polarity of the offset voltage is defined as “negative” when the actual voltage is lower than the desired voltage.

In comparison with the reduction of the offset voltage, the inversion of the polarity of the offset voltage is easier in the technical view, and may be a more reasonable approach. The offset voltage of an amplifier is most often due to the dispersion of the threshold voltage seen in the MOS transistor pair which forms the input differential stage, and the dispersion of the threshold voltage seen in the MOS transistor pair which forms the active load connected to the input differential stage (such as for example the current mirror circuit). Thus, switching the connection between the input node of the amplifier and the MOS transistor pair forming the input differential stage, as well as the connection to the MOS transistor pair forming the active load may allow inverting the polarity of the offset voltage while maintaining the amplitude of the offset voltage.

More specifically, the patent publication JP-A-H11-305735 discloses a technology for avoiding the problem of the offset voltage by swapping the MOS transistor pair in the offset input differential stage at a cycle of 4 frame interval to invert the polarity of the offset voltage (see for example paragraph [0125] of the reference).

In addition, the Japanese patent publication JP-A-2002-108303 discloses a technology for avoiding the problem of offset voltage by inverting the polarity of offset voltage for a predetermined number of horizontal lines from within a predetermined number of frame intervals. In this patent, when one frame interval is formed of eight horizontal lines, as an example, the polarity of the offset voltage is inverted for every seven horizontal lines to cancel the offset voltage thereby for the 14 frame intervals as one cycle.

To further improve the image quality, it maybe preferable, as disclosed in the patent publication JP-A-H11-249623, to invert the plurality of the offset voltage for a predetermined number of horizontal lines within each frame interval. JP-A-H11-249623 publication discloses a technology for avoiding the problem of the offset voltage, by inverting the polarity of the offset voltage for every n horizontal lines in each frame interval and every n frame intervals. The foregoing patent publication also discloses a source driver, for generating a control signal (A, B) for controlling the polarity of the offset voltage of the power amplifier from the output timing controlling clock (CL1) for outputting the display data stored in the data latch circuit to the signal line of the liquid crystal display panel and from the frame interval recognizing signal (FLMN) for acknowledging each frame interval, then inverting the polarity of the offset voltage for every two horizontal lines within each frame interval, and for every two frame intervals (see for example paragraphs [0017], [0055], and FIG. 24). The circuit disclosed in this patent publication has the spatial cycling interval for inverting the polarity of the offset voltage fixed to two horizontal lines, because it uses the output timing controlling clock (CL1) and the frame interval recognizing signal (FLMN) for generating the control signal (A, B).

SUMMARY OF THE INVENTION

As disclosed in JP-A-H11-249623, the technology of inverting the polarity of the offset voltage for every given number of horizontal lines is positively effective in the improvement of the image quality. However, although in the above reference, the control of the polarity of the offset voltage when driving in dot inverted drive (which is a type of 1H inverted drive) is described, nothing is noted for the 2H inverted drive. The inventors of the present invention have revised that the preferable control method of the polarity of the offset voltage may vary according to the spatial cycle in which the polarity of the data signal is inverted (more specifically, the 1H inverted drive has a control method different from the 2H inverted drive) The inversion of the polarity of the offset voltage as disclosed in the JP-A-H11-249623 document may be preferable when using the 1H inverted drive (as in the dot inverted drive), however is not preferable in the 2H inverted drive.

For example, as shown in FIG. 1, consider a case of generating the data signal by a power amplifier, which has two statuses, namely a status "A" in which the polarity of the offset voltage is "positive" and another status "B" in which the polarity of the offset voltage is "negative", and which is capable of outputting both polarities of data signal (note that in practice it is unknown in which status the polarity of the offset voltage is going "positive", in case in which the power amplifier goes into one of two statuses).

The power amplifier may be capable of outputting four combinations of the data signal as follows:

Type 1: both the polarity of the data signal and that of the offset voltage are positive (upward arrow of the status "A");

Type 2: the polarity of the data signal is negative and the polarity of the offset voltage is positive (downward arrow of the status "A");

Type 3: the polarity of the data signal is positive and the polarity of the offset voltage is negative (upward arrow of the status "B");

Type 4: both the polarity of the data signal and the polarity of the offset voltage are positive (downward arrow of the status "B").

In FIG. 1, the common voltage Vcom is the voltage level of the common electrode of the liquid crystal display panel. According to the revision by the inventors of the present invention, it is preferable for the pixels of the liquid crystal display panel to be supplied with these four types of data signals spatially evenly in order to improve the image quality of the displayed image.

If the spatial cycle of inverting the polarity of the offset voltage is fixed to two horizontal lines as is done in the source driver described in the JP-A-H11-249623 document, it will be desirable for the 1H inverted drive, however it will not be desirable for the 2H inverted drive. FIGS. 2A and 2B illustrate the types of the data signals to be supplied to each pixel in a frame interval, when the spatial cycle of inversion of the polarity of the offset voltage is fixed to 2 horizontal lines, in case of the 1H inverted drive (dot inverted drive) and in case of the 2H inverted drive, respectively. The symbols "↑A" "↓A" "↑B" "↓B" in FIGS. 2A and 2B have the meaning as follows:

"↑A": the pixel is supplied with the data signal having the positive polarity from the power amplifier in status "A" (i.e., the pixel is to be supplied with the data signal of "type 1");

"↓A": the pixel is supplied with the data signal having the negative polarity from the power amplifier in status "A" (i.e., the pixel is to be supplied with the data signal of "type 2");

"↑B": the pixel is supplied with the data signal having the positive polarity from the power amplifier in status "B" (i.e., the pixel is to be supplied with the data signal of "type 3");

"↓B": the pixel is supplied with the data signal having the negative polarity from the power amplifier in status "B" (i.e., the pixel is to be supplied with the data signal of "type 4").

It should be noted here that according to the operation shown in FIGS. 2A and 2B, the status of the power amplifier is switched for every two horizontal lines and for every two frame intervals.

As shown in FIG. 2A, when performing the 1H inverted drive, all four types of data signals as have been described above are applied to one pixel row. For example, in the first frame interval, the type of the data signal supplied to each pixel in the leftmost row may be "↑A", "↓A", "↑B", "↓B" sequentially in this order. However, as shown in FIG. 2B, when the 2H inverted drive is in use, only two types of data signals appears in one pixel row. For example, in the first frame interval, the types of data signals to be supplied to the pixels in the leftmost row are "↑A", "↑A", "↓B", "↓B", sequentially in this order, and there is no pixel having the types of data signal "↓A" or "↑B". As can be appreciated from the foregoing description, when the 2H inverted drive is in use, four types of data signals are not supplied spatially evenly. As a result the image quality when the 2H inverted drive is performed will be degraded.

It may be a problem that the source driver is not accommodated with the 2H inverted drive, when driving a large size liquid crystal display panel in particular. There may be a case in which the user may request a given source driver to comply with both the 1H inverted drive and the 2H inverted drive, however, with the conventional source driver which does not comply with the 2H inverted drive, no image may be displayed with a better image quality in both the 1H inverted drive and the 2H inverted drive.

It is therefore preferable that a source driver be capable of controlling the polarity of the offset voltage in correspondence with the 2H inverted drive, and it is more preferable that a source driver be capable of complying with both the 1H inverted drive and the 2H inverted drive.

To solve the above problems, the present invention adopts the means as will be described below. The description of the technical matter forming the means has a number or symbol used in the [best mode for carrying out the invention] in order to promptly indicate the correspondence of the description in [what is claimed is] with the description in [best mode for carrying out the invention]. The added numbers or symbols are not considered to be used in the interpretation of the technical scope of the present invention, cited in the accompanying claims.

The liquid crystal display device according to the present invention has a liquid crystal display panel (1) having data lines (11), and a source driver (3) for supplying the data signal to the data line (11). The source driver (3) includes a offset cancel controller circuit (40) for generating an offset cancel control signal (OCC), and an amplifier (71) for use in generating the data signal, arranged so as to invert the polarity of the offset voltage in response to the offset cancel control signal (OCC) The offset cancel controller circuit (40) is supplied with a pattern select signal for indicating the cycle to invert the polarity of the offset voltage, and generates the offset cancel control signal in response to the pattern select signal.

In a liquid crystal display device of the arrangement as described above, as offset cancel control signal (OCC) is generated in response to the pattern select signal (PSEL), the cycle to invert the polarity of the offset voltage is allowed to be automatically controlled in an optimum manner in response to the cycle to invert the polarity of the data signal. Thus according to the arrangement of the liquid crystal display device as described above the spatial cycle to invert the polarity of the offset voltage may be controlled in response to the spatial cycle to invert the polarity of the data signal, in order to maintain the better image quality of the displayed image.

In case in which the source driver (3) is arranged to be capable of driving the liquid crystal display panel in both the 1H inverted drive and the 2H inverted drive, it is preferable that the polarity of the offset voltage of the amplifiers (38) (71) will be inverted for every two horizontal lines when driving the liquid crystal display panel in the 1H inverted drive mode, and inverted for everyone horizontal line when driving the liquid crystal display panel in the 2H inverted drive mode. When driving the liquid crystal display panel (1) in the 2H inverted drive mode, inverting the polarity of the offset voltage for every one horizontal line is specifically effective in improving the image quality of the displayed image.

According to the present invention, a source driver is provided which is capable of controlling the spatial cycle of inversion of the polarity of the offset voltage in response to the spatial cycle of the inversion of the polarity of the data signal.

Also according to the present invention, a source driver is provided which is capable of appropriately controlling the polarity of the offset voltage in response to the 2H inverted drive mode.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

A detailed description of some preferred embodiments embodying the present invention will now be given referring to the accompanying drawings. It is to be noted that in the accompanying drawings the same members are designated to the identical reference numbers. In addition, if necessary the plurality of same component members may be distinguished one from another by the additional character added to the reference number.

First Embodiment

Figure 3:
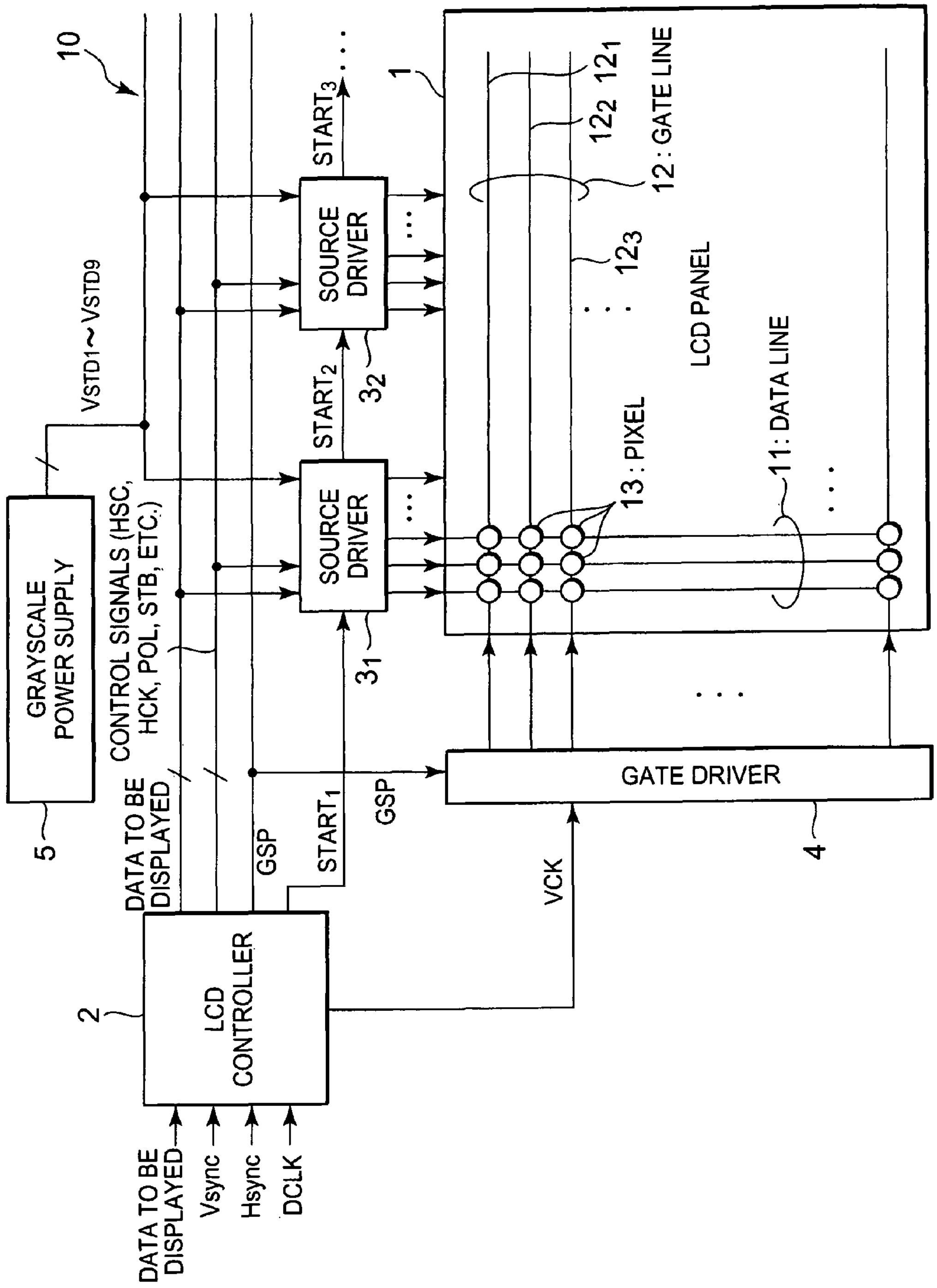
FIG. 3 shows a schematic block diagram illustrating the arrangement of a liquid crystal display device according to first preferred embodiment of the present invention.

Now referring to FIG. 3 there is shown a schematic block diagram illustrating the arrangement of a liquid crystal display device 10 according to the first preferred embodiment of the present invention. The liquid crystal display device 10 includes a liquid crystal display panel 1, a liquid crystal display controller 2, a source driver 3, a gate driver 4, and a grayscale power supply 5.

The LCD panel 1 has data lines (signal lines) 11 extending in the vertical direction, gate lines (scan lines) 12 extending in the horizontal direction and pixels 13 located at the intersection of these lines. In the following description, one row of pixels 13 connected to the same gate line 12 may also be referred to as a horizontal line, and one row of pixels connected to a gate line 12*i* may also be referred to as the pixels 13 in the ith horizontal line.

The LCD controller 2 controls the source driver 3 and the gate driver 4 to display a desired image on the LCD panel 1. More specifically, the LCD controller 2 transfers the display data received from an external source to the source driver 3, and supplies a variety of control signals to the source driver 3 and the gate driver 4 as well. The operation of the LCD controller 2 may be controlled by a variety of control signals (such as a horizontal synchronization signal Hsync, a vertical synchronization signal Vsync, a dot clock signal DCLK, etc.).

The control signals supplied from the LCD controller 2 to the source driver 3 include a horizontal synchronization signal HSC, a horizontal clock HCK, a polarity signal POL, and a strobe signal (latch signal) STB. In addition, the LCD controller 2 supplies to the source driver 31 a start pulse signal START1. The technical significance of these control signals will be described in greater details herein below along with the description of the source driver 3.

The control signals to be supplied to the gate driver 4 include a vertical clock VCK, and a gate start pulse signal GSP. The gate start pulse signal GSP is a signal which acts as a trigger to initiate the scan of the gate line 12 by the gate driver 4, and when the gate start pulse signal GSP is activated, the gate driver 4 activates the gate lines 12 sequentially from the gate line 12 immediately next to the source driver 3. The timing of activating the gate start pulse signal GSP is synchronized with the vertical synchronization signal Vsync supplied to the LCD controller 2, and a predetermined period of time after the vertical synchronization signal Vsync is activated, the gate start pulse signal GSP will be activated.

The source driver 3 supplies the data signal to each data line 11 of the LCD panel 1. The data signal has a voltage level corresponding to the grayscale of the pixel 13, and once the data signal is supplied to the pixel 13, a pixel voltage corresponding to a desired grayscale will be written to the pixel 13.

The gate driver 4 scans the gate lines 12 of the LCD panel 1. More specifically, it activates the lines sequentially. The data signal generated by the source driver 3 is supplied to the pixel 13 connected to the activated gate line 12.

The grayscale power supply 5 supplies to each source driver 3 a grayscale power voltage Vstd1-Vstd9. As will be described later. The grayscale power voltage Vstd1-Vstd9 will be used to generate one set of grayscale voltages, each corresponding to one grayscale that the pixel 13 may take in each source driver 3.

Figure 4:
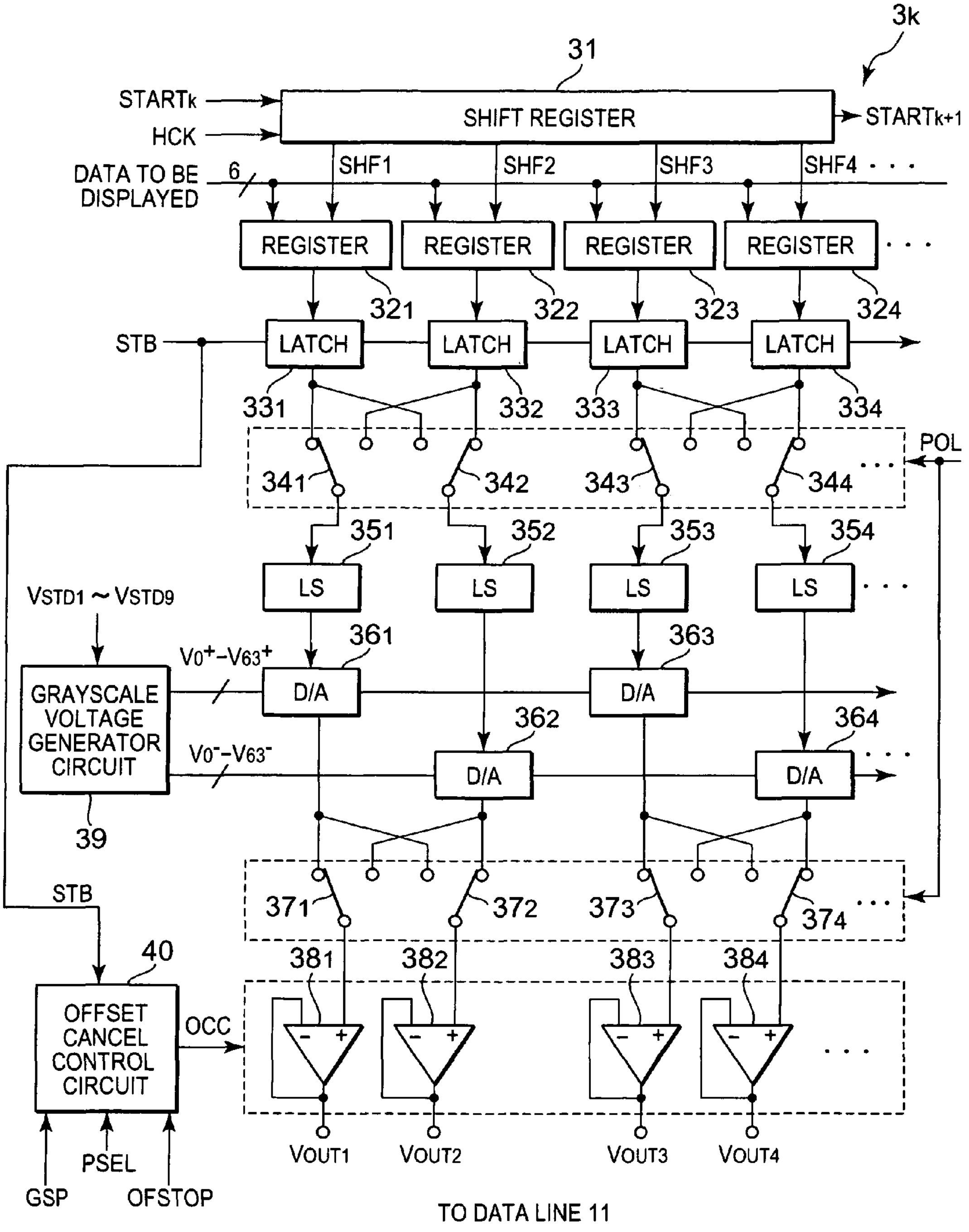
FIG. 4 shows a schematic block diagram illustrating the arrangement of a source driver according to the first preferred embodiment of the present invention.

Now referring to FIG. 4 there is shown a schematic block diagram illustrating the arrangement of a source driver 3. The source driver 3 includes a shift register 31, registers 321-32n, latches 331-33n, cross-switches 341-34n, level shifters 351-35n, D/A converters 361-36n, cross-switches 371-37n, power amplifiers 381-38n, grayscale voltage generator circuit 39, an offset cancel controller circuit 40, and output nodes Vout1-Voutn connected to the data line 11. For sake of the clarity the source drivers 32, the latch circuits 33, cross-switches 34, level shifters 35, D/A converters 36, cross-switches 37, and the output nodes Vout are shown only four for each.

The shift register 31, in response to the start pulse signal STARTk, generates shift signals SHF1-SHFn allowing latching of display data in the register 32. The start pulse signal STARTk is a signal allowing the start of uptake of the display data into the source driver 3*k*. As shown in FIG. 3, the source driver 31 is supplied with the start pulse signal STARTk from the LCD controller 2, and any other source drivers 3*k* are supplied with the start pulse signal STARTk from its immediately next source driver 3*k*−1. When the start pulse signal STARTk is activated, the shift register 31 performs its shift operation to sequentially activate the shift signals SHF1-SHFn. In addition, once the shift signal SHFn is finally activated, the shift register 31 in the source driver 3*k* activates the start pulse signal STARTk+1 to be supplied to the next source driver 3*k*+1.

Each of the registers 321-32n latches the display data in response to the activation of their respective shift signals SHF1-SHFn. The shift signals SHF1-SHFn are sequentially activated, so that the registers 321-32n sequentially latch the display data.

Each of the latch circuits 331-33n, in response to the activation of the strobe signal Strobe Signal STB, latches the display data maintained in the registers 321-32n. The strobe signal STB is a signal instructing the latches 331-33n to latch the display data, and is activated in synchronism with the start of a horizontal period. The latch circuits 331-33n are operable responsive to the activation of the strobe signal STB, it is worth noting here that they simultaneously latch the display data maintained in the registers 321-32*n*.

The cross-switches 341-342 in response to the polarity signal POL switch the connection between the latch circuits 331-33n and the level shifters 351-35n. The polarity signal POL is a signal specifying the polarity of the data signal to be supplied to the data lines 11. In the present embodiment, when the polarity signal POL is at "high" level, odd number cross-switches 342*i*−1 connect the odd number latch circuits 332*i*−1 with the odd number level shifters 352*i*−1, and the even number cross-switches 342*i* connect the even number latch circuits 332*i* to the even number level shifters 352*i*. On the other hand the polarity signal POL is at "low" level, then the odd number cross-switches 342*i*−1 connect the even number latch circuits 332*i* with the odd number level shifters 352*i*−1, and the even number cross-switches 342*i* connect the odd number latch circuits 332*i*−1 with the even number level shifters 352*i*.

The level shifters 351-35n are provided to match the output signal level of the latch circuits 331-33n with the input signal level of the D/A converters 361-36n. The level shifters 351-35n transfers the display data received from the latch circuits 331-33n while converting the signal level.

The D/A converters 361-36n performs D/A conversion over the display data sent from the latch circuits 331-33n to output the grayscale voltage having a voltage level corresponding to the display data. It is to be noted here that the latch circuit 33 from which the D/A converter 36 receives the display data is switched by the cross-switch 34.

The odd number D/A converters 362*i*−1 is arranged so as to output the grayscale voltage having the positive polarity, while the even number D/A converters 362*i* are arranged so as to output the grayscale voltage having the negative polarity. More specifically, the odd number D/A converters 362*i*−1 is supplied with one set of grayscale voltages V0+-V63+ having the positive polarity (with respect to the common voltage Vcom) from the grayscale voltage generator circuit 39, and thus the odd number D/A converters 362*i*−1 will select and output the grayscale voltage corresponding to the received display data, from within the grayscale voltages V0+ to V63+. On the other hand the even number D/A converters 362*i* are supplied with one set of grayscale voltages V0− to V63− having the negative polarity from the grayscale voltage generator circuit 39, and thus the even number D/A converters 362*i* will select and output the grayscale voltage corresponding to the received display data from within the grayscale voltages V0− to V63−.

The cross-switches 371-37n in response to the polarity signal POL switch the connection between the D/A converters 361-36*n* and the power amplifiers 381-38n. In the present embodiment, when the polarity signal POL is at "high" level, the odd number cross-switches 372*i*−1 connect the odd number D/A converters 362*i*−1 with the odd number power amplifiers 382*i*−1, the even number cross-switches 372*i* connect the even number D/A converters 362*i* with the even number power amplifiers 382*i*. On the other hand, when the polarity signal POLARITY is at "low" level, the odd number cross-switches 372*i*−1 connect the even number D/A converters 362*i* with the odd number power amplifiers 382*i*−1, and the even number cross-switches 372*i* connect the odd number D/A converters 362*i*−1 with the even number power amplifiers 382*i*.

Each of the power amplifiers 381-38n receives the grayscale voltage from the D/A converters 361-36n, and each outputs the data signal having the same voltage level as the received grayscale voltage to the data line through their respective output node Vout-Voutn. In the present embodiment, for each of the power amplifiers 381-38n, a voltage follower type is used which has a rail-to-rail configuration. Each of the power amplifiers 381-38n are configured so as to be capable of outputting both data signals having a positive polarity and data signals having a negative polarity. A power amplifier and its neighbor 382*i*−1 and 382*i* output data signals having different polarity. More specifically, when the odd number power amplifiers 382*i*−1 output the data signal having the positive polarity, and the even number power amplifiers 382*i*−1 output the data signal having the negative polarity, the polarity signal POL is to be pulled up to "high" level, then the odd number D/A converters 362*i*−1 (to be supplied with a grayscale voltage of positive polarity) are connected to the odd number power amplifiers 382*i*−1, and the even number D/A converters 362*i* (to be supplied with a grayscale voltage of negative polarity) are connected to the power amplifiers 382*i*. On the other hand when the odd number power amplifiers 382*i*−1 output data signals having a negative polarity and the even number power amplifiers 382*i*−1 output data signals having a negative polarity, the polarity signal POL is to be pulled down to "low" level, then the outputs from the odd number D/A converters 362*i*−1 are connected to the even number power amplifiers 382*i*, and the outputs of the even number D/A converters 362*i* (to be supplied with a grayscale voltage having a negative polarity) are connected to the odd number power amplifiers 382*i*−1.

The power amplifiers 381-38n are configured so as to be responsive to the offset cancel control signal OCC supplied by the offset cancel controller circuit 40 to allow inverting the polarity of the offset. More specifically, the power amplifiers 381-38n are formed so as to take two statuses in which the polarity of the offset is opposite, the polarity of the offset may be determined by the offset cancel control signal OCC. In the following description one status is defined as status "A" and the other as status "B". In addition, the description assumes that when the offset cancel control signal OCC is at "high" level the power amplifiers 381-38n are set to status "A" and when the offset cancel control signal OCC is at "low" level the power amplifiers 381-38n are set to status "B".

Figure 5A:
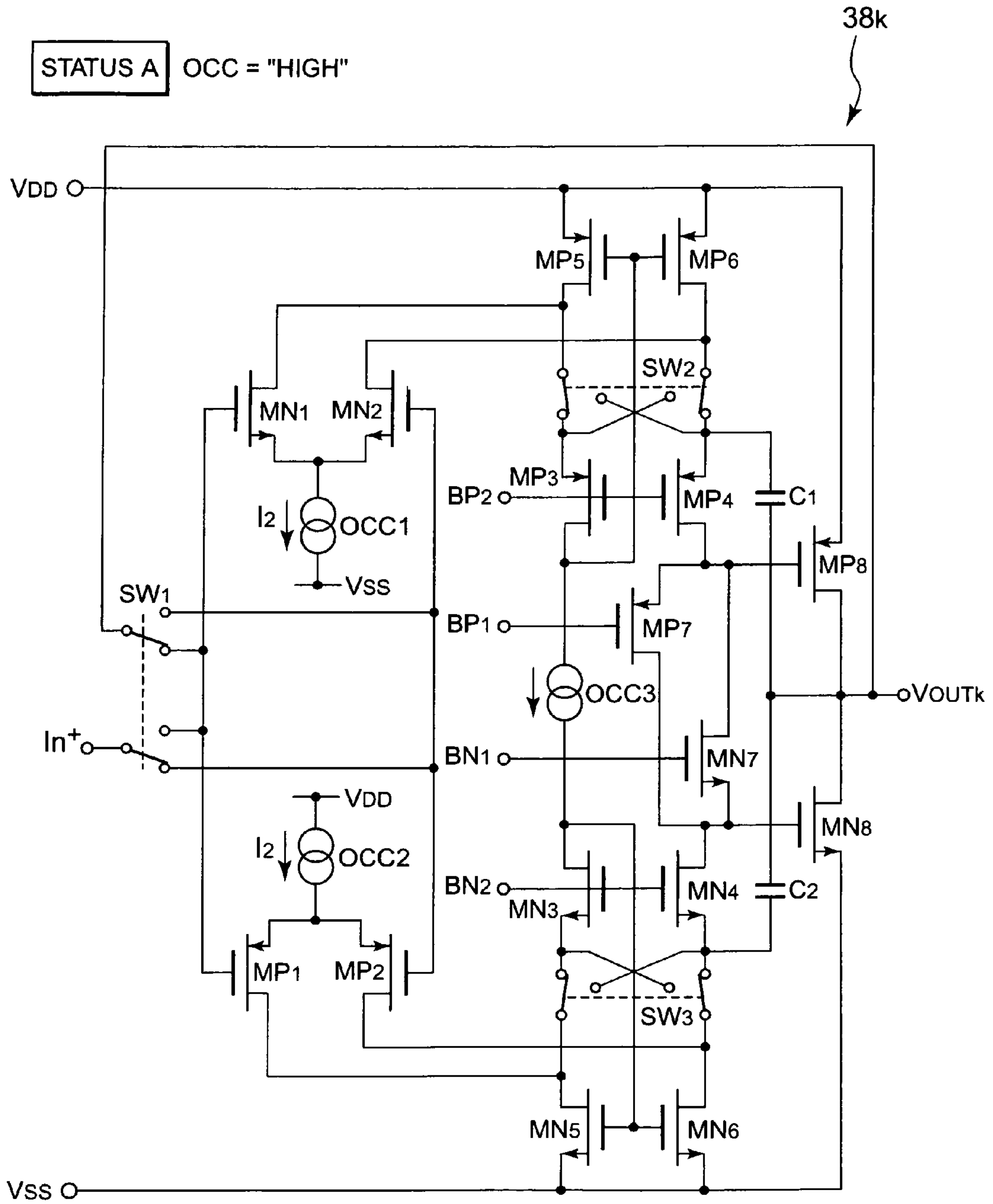
FIG. 5A shows a schematic circuit diagram illustrating an exemplary arrangement of a power amplifier according to the first preferred embodiment of the present invention, in which the connection between circuit elements are shown when the power amplifier is set to "status A"
Figure 5B:
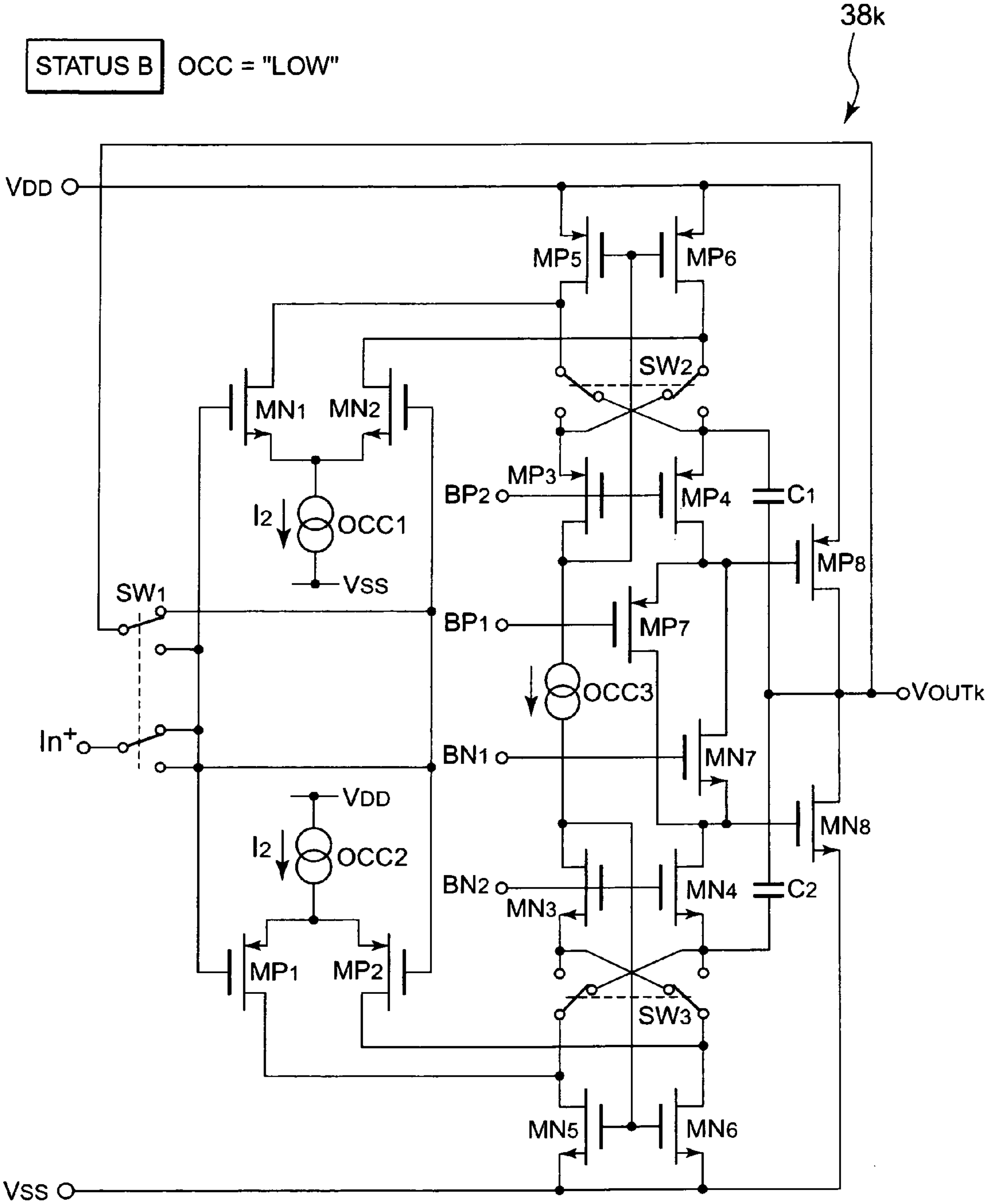
FIG. 5B shows a schematic circuit diagram illustrating an exemplary arrangement of a power amplifier according to the first preferred embodiment of the present invention, in which the connection between circuit elements are shown when the power amplifier is set to "status B"

Now referring to FIGS. 5A and 5B, there are shown schematic circuit diagrams illustrating the arrangement of power amplifiers 381-38n. Each power amplifier 38 includes PMOS transistors MP1-MP8, NMOS transistors MN1-MN8, switches SW1-SW3, capacitors C1 and C2, and constant current power supplies CCS1-CCS3. The PMOS transistors MP1 and MP2 are a PMOS transistor pair which forms an input differential stage; the NMOS transistors MN1 and MN2 are a NMOS transistor pair which forms an input differential stage. The PMOS transistors MP5 and MP6 are a PMOS transistor pair which forms an active load, and the NMOS transistors MN5 and MN6 are an NMOS transistor pair which forms an active load. A bias voltage BP2 is supplied to the gates of the PMOS transistors MP3 and MP4, and a bias voltage BP1 is supplied to the gate of the PMOS transistor MP7. Additionally, to the gates of the NMOS transistors MN3 and MN4 a bias voltage BN2 is supplied, and to the gate of the NMOS transistor MN7 a bias voltage BN1 is supplied.

A power amplifier 38 having an arrangement as described above, the offset voltage appears, mainly because of (1) the variations of the threshold voltage of the transistor pair forming the input differential stage (the PMOS transistors MP1 and MP2, and the NMOS transistors MN1 and MN2) and of (2) the variations of the threshold voltage of the transistor pair forming the active load (the PMOS transistors MP5 and MP6, and the NMOS transistors MN5 and MN6).

The power amplifier 38 shown in FIGS. 5A and 5B can switch the connection between the transistor pairs forming the input differential stage and the active load by means of the switches SW1-SW3 to invert the polarity of the offset voltage. The inversion of the polarity of the offset voltage is performed by operating the switches SW1-SW3 in response to the offset cancel control signal OCC. It is to be noted here that all the switches SW1-SW3 operate an interlocked manner. In FIG. 5 A, there is shown the connection of switches SW1-SW3 when the offset cancel control signal OCC is at "high" level; in FIG. 5B there is shown the connection of switches SW1-SW3 when the offset cancel control signal OCC is at "low" level.

Now referring to FIG. 5A, when the offset cancel control signal OCC is at "high" level, the switches SW1-SW3 operate as follows:

The switch SW1 connects the input node IN+ to the gates of the PMOS transistor MP1 and the NMOS transistor MN1, and the output node Voutk to the gates of the PMOS transistor MN2 and the NMOS transistor MN2. The switch SW2 connects the drain of the PMOS transistor MP5 to the source of the PMOS transistor MP3, and the drain of the PMOS transistor MP6 to the source of the PMOS transistor MP4. Finally the switch SW3 connects the drain of the NMOS transistor MN5 to the source of the NMOS transistor MN3, and the drain of the NMOS transistor MN6 to the NMOS transistor MN4.

Now referring to FIG. 5B, when the offset cancel control signal OCC is at "low" level, the switches SW1-SW3 operate as follows:

The switch SW1 connects the input node IN+ to the gates of the PMOS transistor MP2 and the NMOS transistor MN2, and the output node Voutk to the gates of the PMOS transistor MN1 and the NMOS transistor MN1. The switch SW2 connects the drain of the PMOS transistor MP5 to the source of the PMOS transistor MP4, and the drain of the PMOS transistor MP6 to the source of the PMOS transistor MP3. Finally the switch SW3 connects the drain of the NMOS transistor MN5 to the source of the NMOS transistor MN4, and the drain of the NMOS transistor MN6 to the source of the NMOS transistor MN3.

Figure 1:
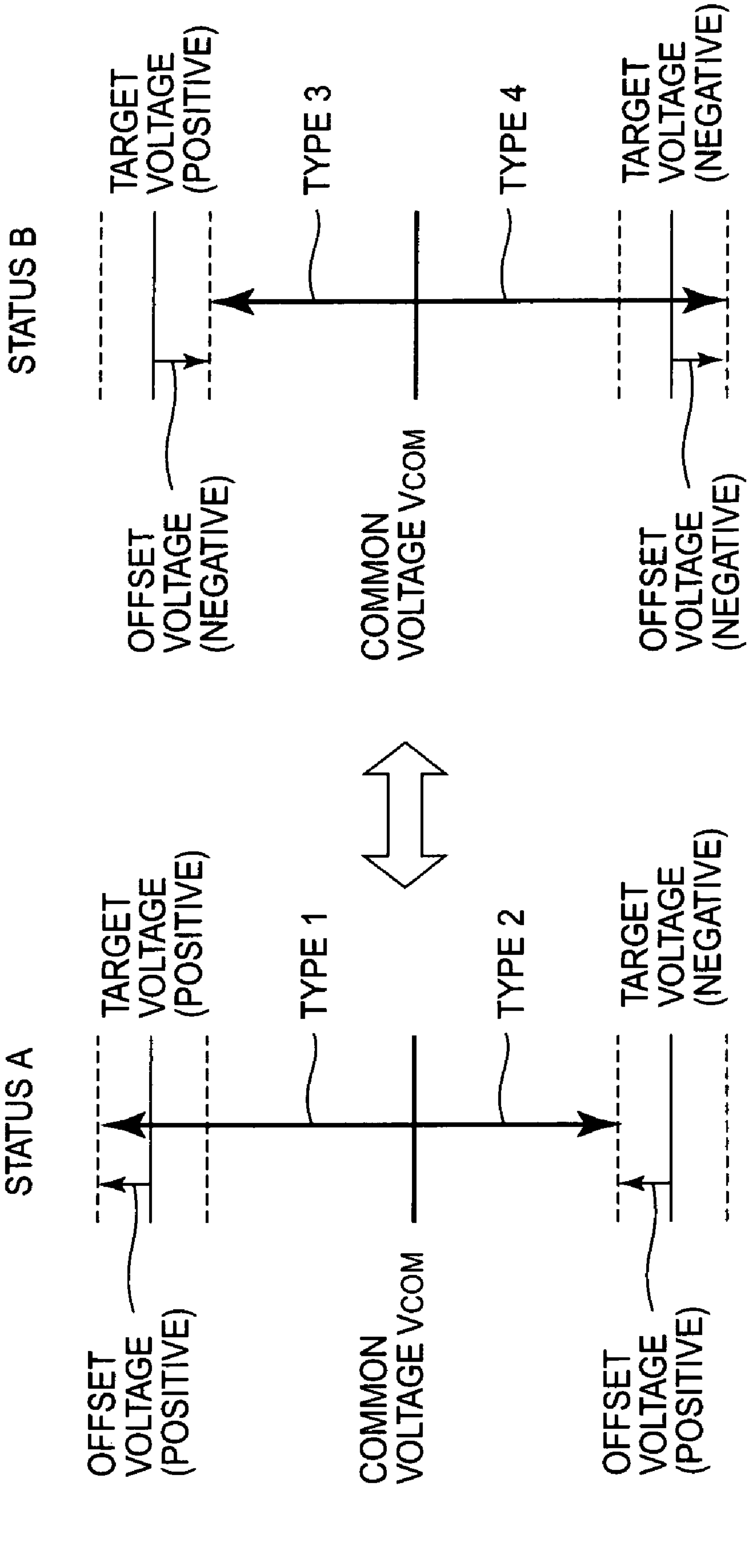
FIG. 1 shows a source driver illustrating four status of an amplifier.

The power amplifier 38, in the operation as described above, outputs the output voltage Vo below, in response to the offset cancel control signal OCC:

$$Vo=Vin\pm Vos$$

where Vin designates to a grayscale voltage to be input into the power amplifier 38, Vos to the offset voltage. The symbol± indicates that the polarity of the offset cancel control signal OCC may be switched depending on the level either "high" or "low". In addition, since the grayscale voltage Vin to be supplied to the input of the power amplifier 38 may take either the positive polarity or the negative polarity, each power amplifier 38 consequently may output four types of data signals as shown in FIG. 1.

Now returning to FIG. 4, the grayscale voltage generator circuit 39 may receive from the grayscale power supply 5 the grayscale power supply voltages Vstd1-Vstd9 to generate the grayscale voltages V0+-V63+ of the positive polarity, and the grayscale voltage V0--V63- of the negative polarity. As have been described above, the grayscale voltages V0+-V63+ of the positive polarity are supplied to the odd number D/A converters 362*i*−1; the grayscale voltages V0--V63- are supplied to the even number D/A converters 362*i*.

The offset cancel controller circuit 40 generates the offset cancel control signal OCC to supply to each power amplifier 38. The offset cancel controller circuit 40 is supplied with an offset cancel enable signal OFSTOP, a pattern select signal PSEL, a gate start pulse signal GSP, and the strobe signal STB. The offset cancel controller circuit 40 generates the offset cancel control signal OCC from these signals.

The offset cancel enable signal OFSTOP is a signal for forbidding the control on the inversion of the polarity of the offset voltage. The control of inverting the polarity of the offset voltage is allowed when the offset cancel enable signal OFSTOP is "low" level. When the offset cancel enable signal OFSTOP is "high" level, the offset cancel control signal OCC is fixed such that the polarity of the offset voltage will not be inverted.

By taking use of the fact that the gate start pulse signal GSP indicates the start of each frame interval, the gate start pulse signal GSP inverts the offset cancel control signal OCC for a predetermined number of frame intervals, in other words may be served for inverting the polarity of the offset voltage. As have been described above, it should be noted that the activation of the gate start pulse signal GSP indicates that each frame interval has been started. In the present embodiment, a signal is formed by ¼ dividing the gate start pulse signal GSP, to generate the offset cancel control signal OCC from the ¼ divided signal. The offset cancel control signal OCC thereby will be inverted for every two frame intervals.

In a similar manner, by taking use of the fact that the strobe signal STB indicates the start of each horizontal period, the strobe signal STB inverts the offset cancel control signal OCC for a desired number of horizontal periods. In other words the strobe signal STB is used for inverting the polarity of the offset voltage. As have been described above, it should be noted here that the activation of the strobe signal STB indicates that each horizontal period has been started. In the present embodiment, signals are formed by ½ dividing the strobe signal STB, and by ¼ dividing the strobe signal STB. From either ½ divided signal or ¼ divided signal the offset cancel control signal OCC is generated. The offset cancel control signal OCC may be thereby inverted for every one horizontal period or every two horizontal period (when the offset cancel enable signal OFSTOP is "low" level).

The pattern select signal PSEL is a signal specifying the cycle to invert the polarity of the offset voltage. When inverting the polarity of the offset voltage for every two horizontal periods, the pattern select signal PSEL will be set to "low". The offset cancel controller circuit 40, in response to the pattern select signal PSEL set to "low", will invert the offset cancel control signal OCC for every two horizontal periods. On the other hand, when inverting the polarity of the offset voltage for every one horizontal period, the pattern select signal PSEL will be set to "high". The offset cancel controller circuit 40 then, in response to the pattern select signal PSEL set to "high", will invert the offset cancel control signal OCC for every one horizontal period.

Figure 6:
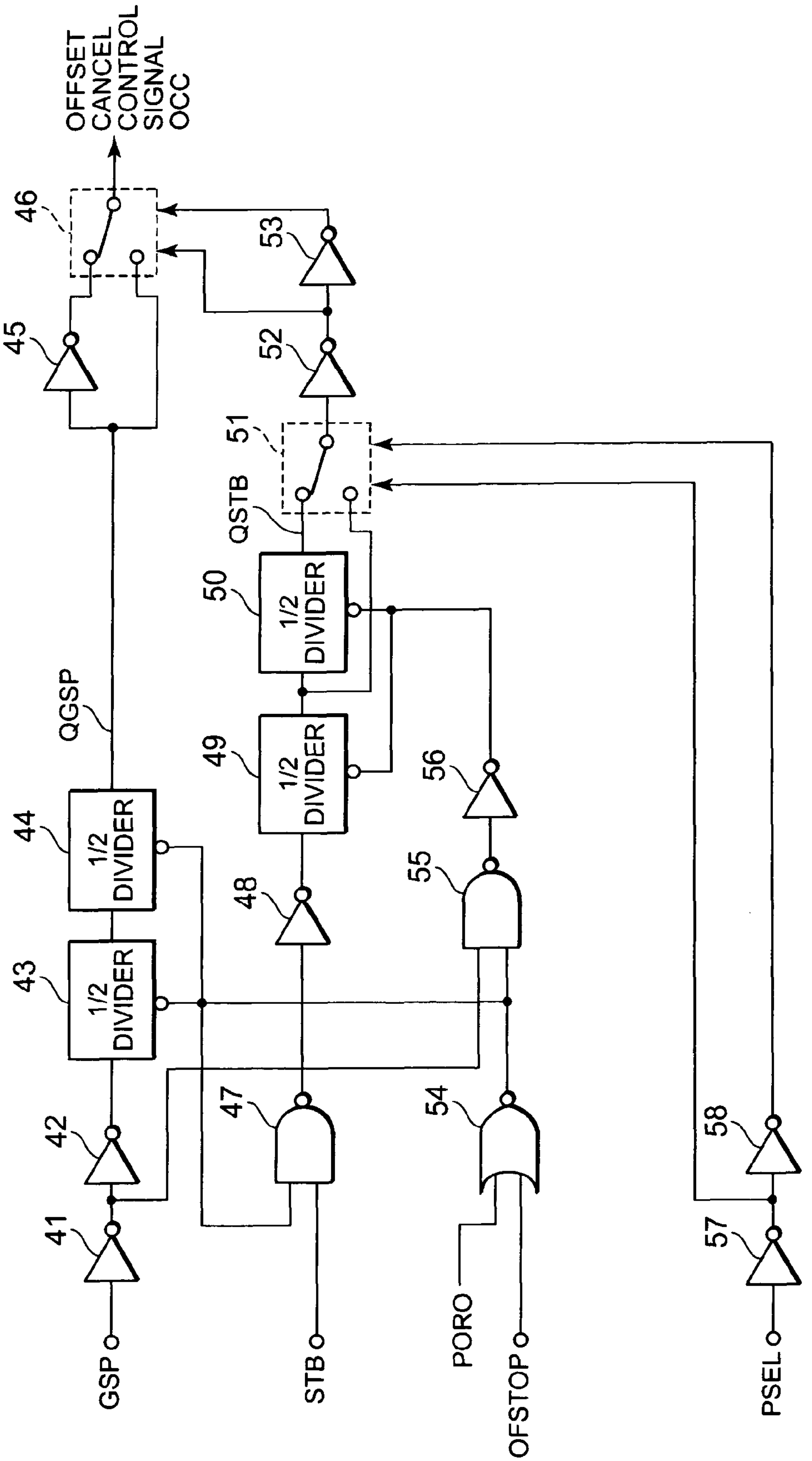
FIG. 6 shows a schematic circuit diagram illustrating an exemplary arrangement of an offset cancel control circuit according to the first preferred embodiment of the present invention.

Now referring to FIG. 6 there is shown a schematic circuit diagram illustrating an exemplary arrangement of the offset cancel controller circuit 40. The offset cancel controller circuit 40 includes inverters 41, 42, 45, 48, 52, 53, 56, 57, and 58; ½ divider circuits 43, 44, 49, and 50; switches 46 and 51; NAND gates 47 and 55; and NOR gate 54. In the present embodiment, the ½ divider circuits 43, 44, 49, and 50 are made by flip-flop circuits. In FIG. 6, the reference "POR" designates to a power-on reset signal. The power-on reset signal POR will be pulled up to "high" level when the source driver 3 is power-on reset.

The ½ divider circuits 43 and 44 are served for dividing the gate start pulse signal GSP. In the following description, the output signal from the ½ divider 43 may be referred to as ½ divided gate start pulse signal HGSP; the output signal from the ½ divider 43 may be referred to as ¼ divided gate start pulse signal QGSP. The ½ divided gate start pulse signal HGSP is a signal made by ½ dividing the gate start pulse signal GSP, and the ¼ divided gate start pulse signal QGSP is a signal made by ¼ dividing the gate start pulse signal GSP.

The ½ dividers 49 and 50 are served for dividing the strobe signal STB. In the following description, the output signal of the ½ divider 49 may be referred to as ½ divided strobe signal HSTB, and the output signal of the ½ divider 43 may be referred to as ¼ divided strobe signal QSTB. Here the ½ divided strobe signal HSTB is a signal made by ½ dividing the strobe signal STB, and the ¼ divided strobe signal QSTB is a signal made by ¼ dividing the strobe signal STB.

The switch 51 has a function that selects which of the ½ divided strobe signal HSTB and the ¼ divided strobe signal QSTB are to be used for generating the offset cancel control signal OCC. The switch 51 selects the ¼ divided strobe signal QSTB when the pattern select signal PSEL is "low" level, and selects the ½ divided strobe signal HSTB when the pattern select signal PSEL is "high" level. The signal selected by the switch 51 is supplied to the serially connected inverters 52 and 53.

The switch 46, responsive to the output signals from the inverters 52 and 53, has a role of inverting the offset cancel control signal OCC. More specifically, the switch 46 selects the output signal from the inverter 45 (i.e., the inverted signal of the ¼ divided strobe signal QSTB) as the offset cancel control signal OCC when the output signal of the inverter 52 is at “high” level. On the other hand when the output signal of the inverter 53 is at “high” level, the switch 46 selects the ¼ divided strobe signal QSTB as the offset cancel control signal OCC. Since the output signals from the inverters 52 and 53 are inverted in synchronism with the ¼ divided strobe signal QSTB or the ½ divided strobe signal HSTB, as a result the offset cancel control signal OCC will be inverted in synchronism with the ¼ divided strobe signal QSTB or the ½ divided strobe signal HSTB.

The operation of the offset cancel controller circuit 40 shown in FIG. 6 is in general as follows:

When the offset cancel enable signal OFSTOP is at “high” level, the reset nodes of the flip-flops which configures the ½ dividers 43, 44, 49, and 50 are set to “low” level, so that the ½ dividers 43, 44, 49 and 50 are maintained in the reset status. Therefore when the offset cancel enable signal OFSTOP is at “high” level the offset cancel control signal OCC will be held fixed.

When the offset cancel enable signal OFSTOP is at “low” level, then the ¼ divided gate start pulse signal QGSP will be inverted for every two frame intervals; the ¼ divided strobe signal QSTB will be inverted for every two horizontal periods; the ½ divided strobe signal HSTB will be inverted for every one horizontal periods. When the pattern select signal PSEL is at “low” level, the, ¼ divided strobe signal QSTB is selected so that the offset cancel control signal OCC will be inverted for every two frame intervals as well as for every two horizontal periods. On the other hand, when the pattern select signal PSEL is at “high” level, the ½ divided strobe signal HSTB will be selected, and as a result the offset cancel control signal OCC will be inverted for every two frame intervals as well as every one horizontal period.

In one preferred embodiment of the present invention the pattern select signal PSEL for controlling the offset cancel controller circuit 40 is supplied from an external source outside the source driver 3. The pattern select signal PSEL may be supplied from the LCD controller 2. Instead of this a bonding pad should be provided on the source driver 3 for supplying the pattern select signal PSEL, the bonding pad may be fixedly held to “high” or “low” level by the external wiring in response to the period of inverting the offset cancel control signal OCC. In another preferred embodiment of the present invention a control data is provided to the source driver 3 from the LCD controller 2 for specifying the value of the pattern select signal PSEL, and the control data may be stored in a register provided in the source driver 3. In this case, the pattern select signal PSEL may be generated by using the control data stored in the register.

Next, the operation of the source driver 3 according to the preferred embodiment of the present invention will be described in greater details.

When driving the LCD panel 1 by the source driver 3 of the preferred embodiment, a period of time for inverting the offset cancel control signal OCC will be set to the source driver 3 by the pattern select signal PSEL (i.e., the period of time of inverting the polarity of the offset voltage from the power amplifier 38). The value of the pattern select signal PSEL, in other words the period of time of inverting the polarity of the offset voltage of the power amplifier 38, may be determined in response to the cycle that the polarity of data signal is inverted.

More specifically, when driving the LCD panel 1 in 1H inverted drive, the pattern select signal PSEL will be set to “low” level. In response to the pattern select signal PSEL set to “low” level, the offset cancel controller circuit 40 will invert the offset cancel control signal OCC for every two horizontal lines. In other words the polarity of the offset voltage of the power amplifier 38 will be inverted for every two horizontal lines. In the following description, the operation of the offset cancel controller circuit 40 when the pattern select signal PSEL is set to “low” level will be described in greater details with reference to FIG. 7. It is to be noted here that in the operation shown in FIG. 7 the offset cancel enable signal OFSTOP is set to “low” level.

Figure 7:
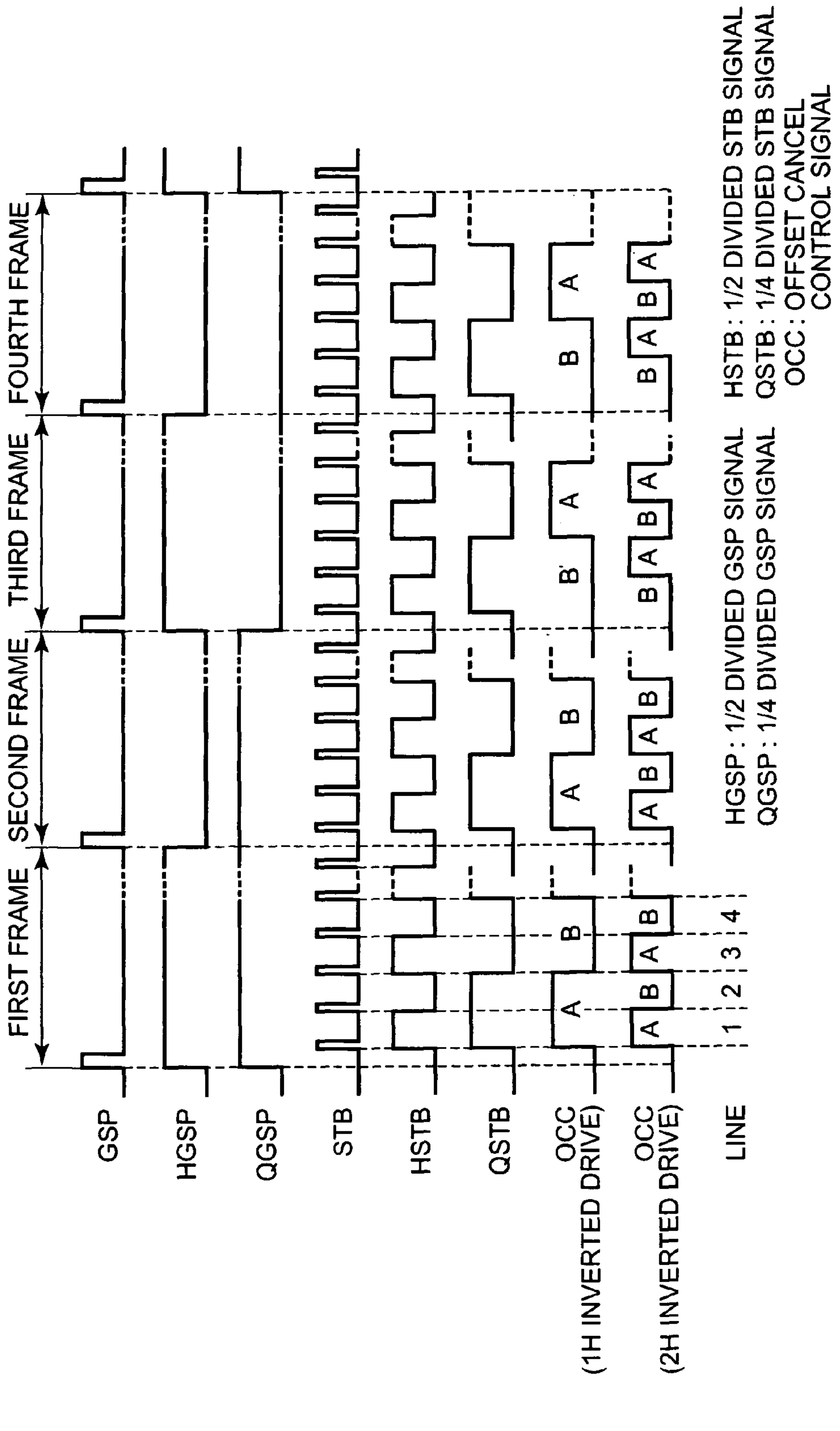
FIG. 7 shows a timing chart illustrating the operation of the offset cancel control circuit according to the first preferred embodiment of the present invention.

As shown in FIG. 7, the gate start pulse signal GSP is activated at the start of each frame interval. Therefore the ¼ divided gate start pulse signal QGSP will be inverted for every two frame intervals (i.e., four frame intervals are taken as one cycle). The strobe signal STB on the other hand will be activated at the start of each horizontal period. Therefore the ¼ divided strobe signal QSTB will be inverted for every two horizontal period (i.e., four horizontal periods are taken as one cycle) and the ½ divided strobe signal HSTB will be inverted for every one horizontal period (i.e., two horizontal periods are taken as one cycle).

In response to the pattern select signal PSEL set to “low” , the ¼ divided strobe signal QSTB will be selected by the switch 51, and the ¼ divided gate start pulse signal QGSP and the ¼ divided strobe signal QSTB will be used for generating the offset cancel control signal OCC. Since the ¼ divided gate start pulse signal QGSP is inverted for every two frame intervals and ¼ divided strobe signal QSTB is inverted for every two horizontal periods, as a result the offset cancel control signal OCC will be inverted for every two frame intervals and for every two horizontal periods. More specifically, the signal level of the offset cancel control signal OCC will be controlled as follows:

In the first frame interval and in the second frame interval, the offset cancel control signal OCC will be “high” level in the (4*i*−3)th and (4*i*−2)th horizontal lines, and will be “low” in the (4*i*−1)th and (4*i*)th horizontal lines. In the third frame interval and in the fourth frame interval, the offset cancel control signal OCC will be set to “low” in the (4*i*−3)th and (4*i*−2)th horizontal lines, and will be set to “high” level in the (4*i*−1)th and (4*i*)th horizontal lines. By doing this, the polarity of the offset voltage of the power amplifier 38 will be inverted for every two frame intervals and for every two horizontal periods.

Figure 2A:
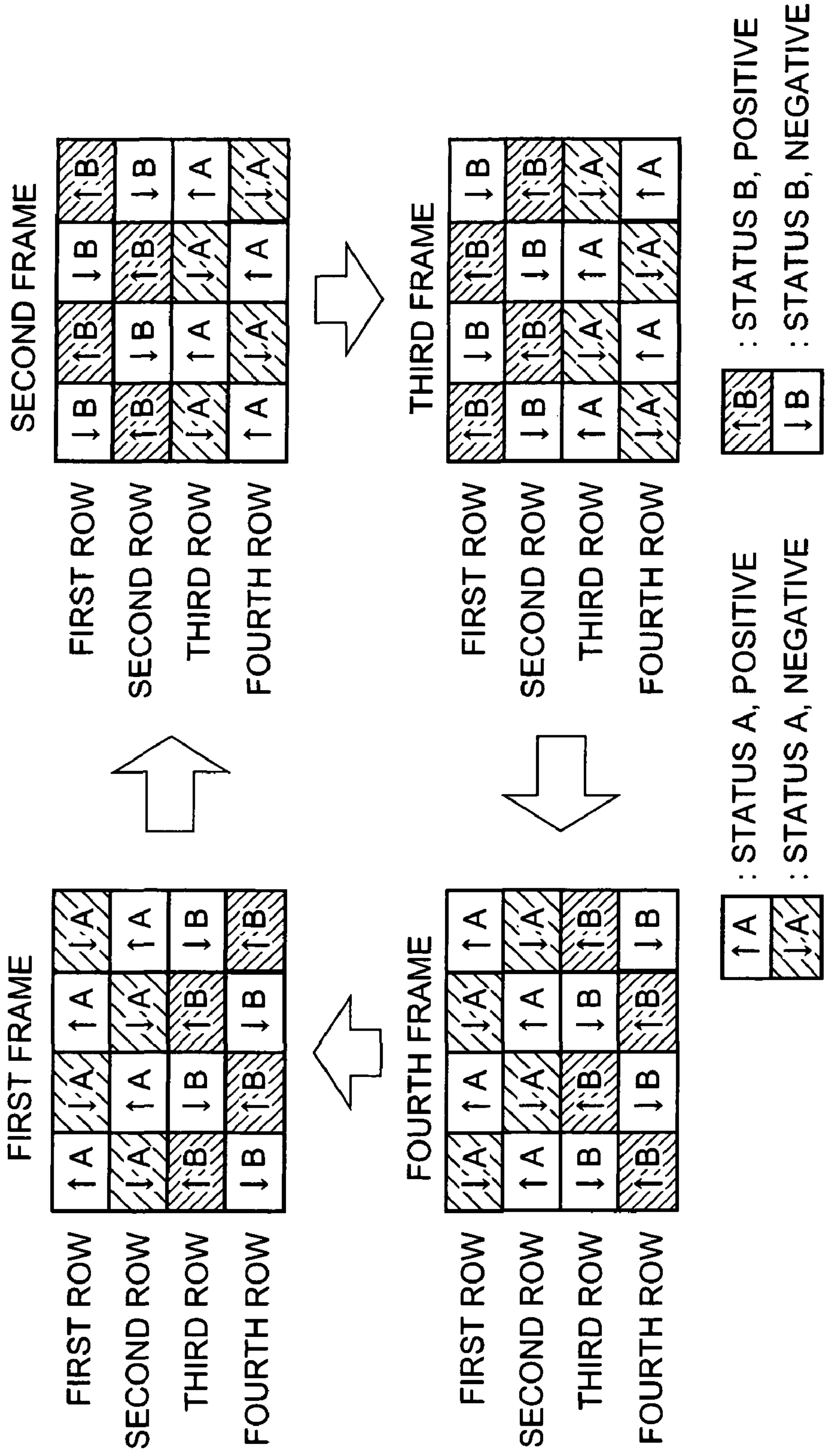
FIG. 2A shows a table illustrating the types of data signal to be supplied to pixels when driving in 1H inverted drive mode in case that the polarity of the offset voltage of the amplifier is fixedly held for two horizontal periods.
Figure 2B:
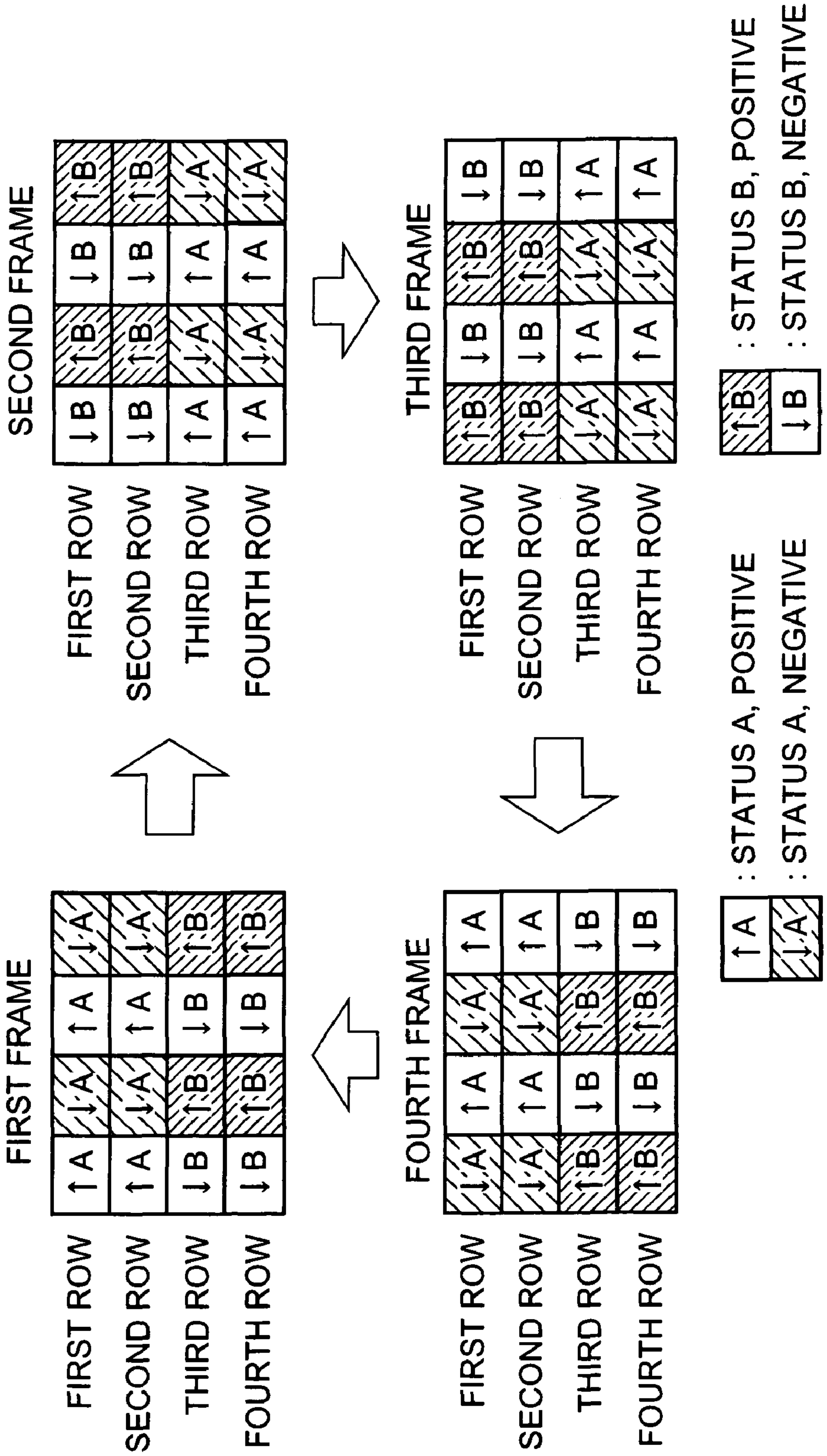
FIG. 2B shows a table illustrating the types of data signal to be supplied to pixels when driving in 1H inverted drive mode in case that the polarity of the offset voltage of the amplifier is fixedly held for two horizontal periods.
Figure 8A:
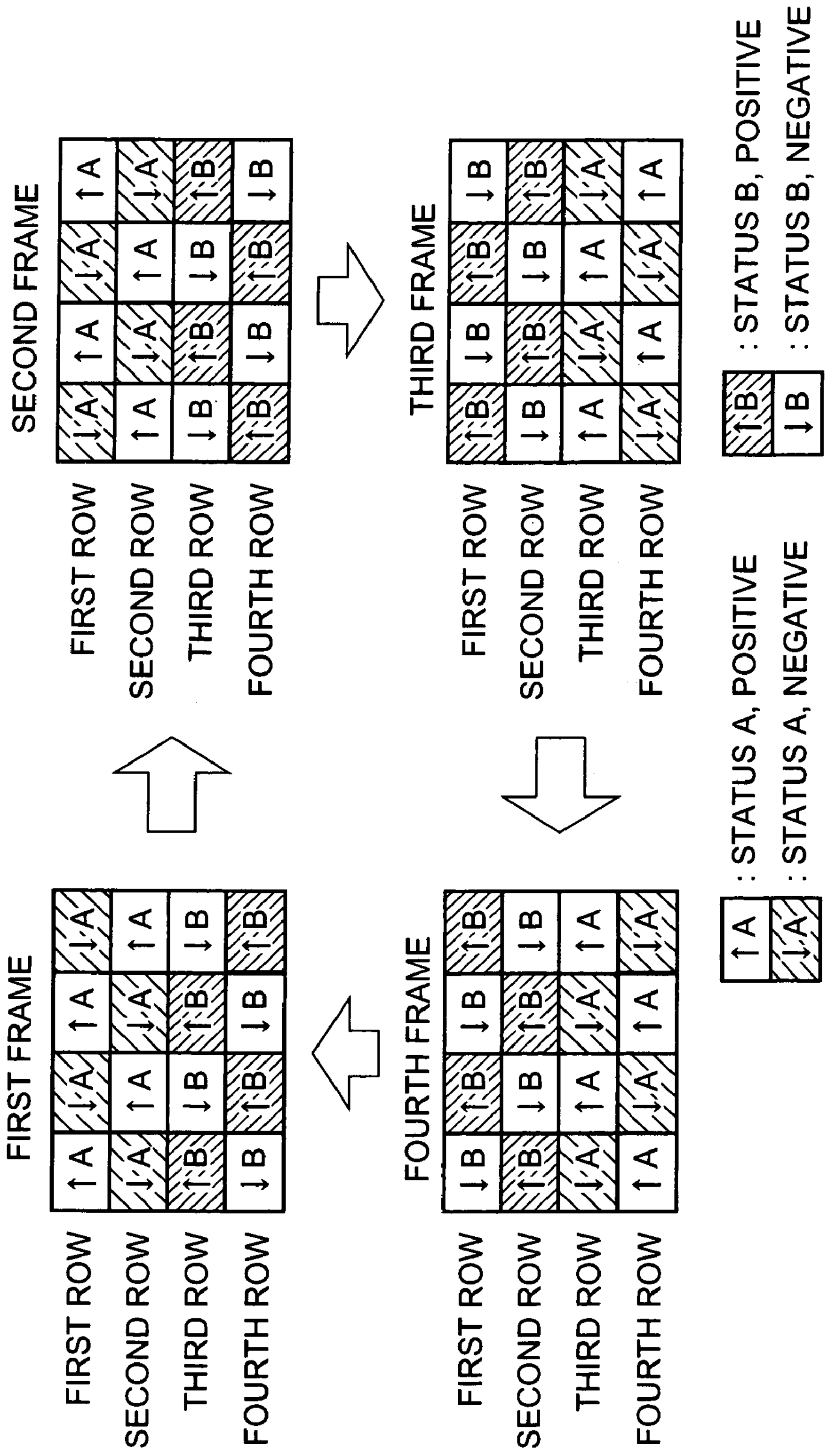
FIG. 8A shows the types of data signal to be supplied to pixels when driving in 1H inverted drive mode and when the offset cancel control signal is generated as shown in FIG. 7.

Now referring to FIG. 8A, there are shown the types of data signal to be supplied to each pixel 13. As is in a similar manner to FIG. 2A and FIG. 2B, in FIG. 8A, the “↑A” “↓A”, “↑B”, “↓B” are used for indicating the following meanings:

“↑A”: the pixel is supplied with data signal having the positive polarity from the power amplifier 38 in status “A” (i.e., the pixel is supplied with the data signal of “type 1”);

“↓A”: the pixel is supplied with data signal having the negative polarity from the power amplifier 38 in status “A” (i.e., the pixel is supplied with the data signal of “type 2”);

“↑B”: the pixel is supplied with the data signal having the positive polarity from the power amplifier 38 in status “B” (i.e., the pixel is supplied with the data signal of “type 3”);

“↓B”: the pixel is supplied with the data signal having the negative polarity from the power amplifier 38 in status “B” (i.e., the pixel is supplied with the data signal of “type 4”).

As shown in FIG. 8A, when driving in 1H inverted drive mode, the polarity of the data signal is inverted for every one horizontal line in each frame interval, while the status of the power amplifier 38 (i.e., the polarity of the offset voltage) is switched for every two horizontal lines. According to such an operation, all four types of data signal as have been described above will appear in one row of pixels, four types of data signal are spatially evenly supplied, allowing effectively improving the image quality. For example, in the first frame interval, the types of data signal to be supplied to pixels in the leftmost row are sequentially "↑A", "↓A", "↑B", "↓B" in this order, and all four types of data signal appear at the leftmost pixel row. It is easily understood that in a similar manner in other frame intervals and in other pixel rows, all four types of data signal appear. In the operation shown in FIG. 8A, it is worth noting that the polarity of data signal is inverted for every one pixel in the horizontal direction (i.e., two pixels are taken as one cycle), thus the dot inverted drive is in operation. In addition, it should be noted that the polarity of the data signal is inverted for every one frame interval; the polarity of the offset voltage is inverted for every two frame intervals.

When driving the LCD panel 1 in 2H inverted drive mode, the pattern select signal PSEL will be set to "high" level. In response to the pattern select signal PSEL set to "high" level, the offset cancel controller circuit 40 will invert the offset cancel control signal OCC for every one horizontal line. In other words it inverts the polarity of the offset voltage of the power amplifier 38 for every one horizontal line.

More specifically, as shown in FIG. 7, in response to the pattern select signal PSEL set to "high" level, the ½ divided strobe signal HSTB is selected by the switch 51, the ¼ divided gate start pulse signal QGSP and the ½ divided strobe signal HSTB will be used for generating the offset cancel control signal OCC. The ¼ divided gate start pulse signal QGSP will be inverted for every two frame intervals, and, in addition, the ½ divided strobe signal HSTB will be inverted for every one horizontal period, so that, as a result, the offset cancel control signal OCC will be inverted for every two frame intervals and for every one horizontal period. More specifically, the signal level of the offset cancel control signal OCC will be controlled as follows: in the first frame interval and in the second frame interval, the offset cancel control signal OCC is "high" level in the (4$i$−3)th and (4$i$−1)th horizontal lines, and is "low" in the (4$i$−2)th and (4$i$)th horizontal lines. In the third frame interval and in the fourth frame interval, the offset cancel control signal OCC is "low" level in the (4$i$−3)th and (4$i$−1)th horizontal lines, and is "high" in the (4$i$−2)th and (4$i$)th horizontal lines. The polarity of the offset voltage of the power amplifier 38 will be thereby inverted for every two frame intervals and for one horizontal period.

Figure 8B:
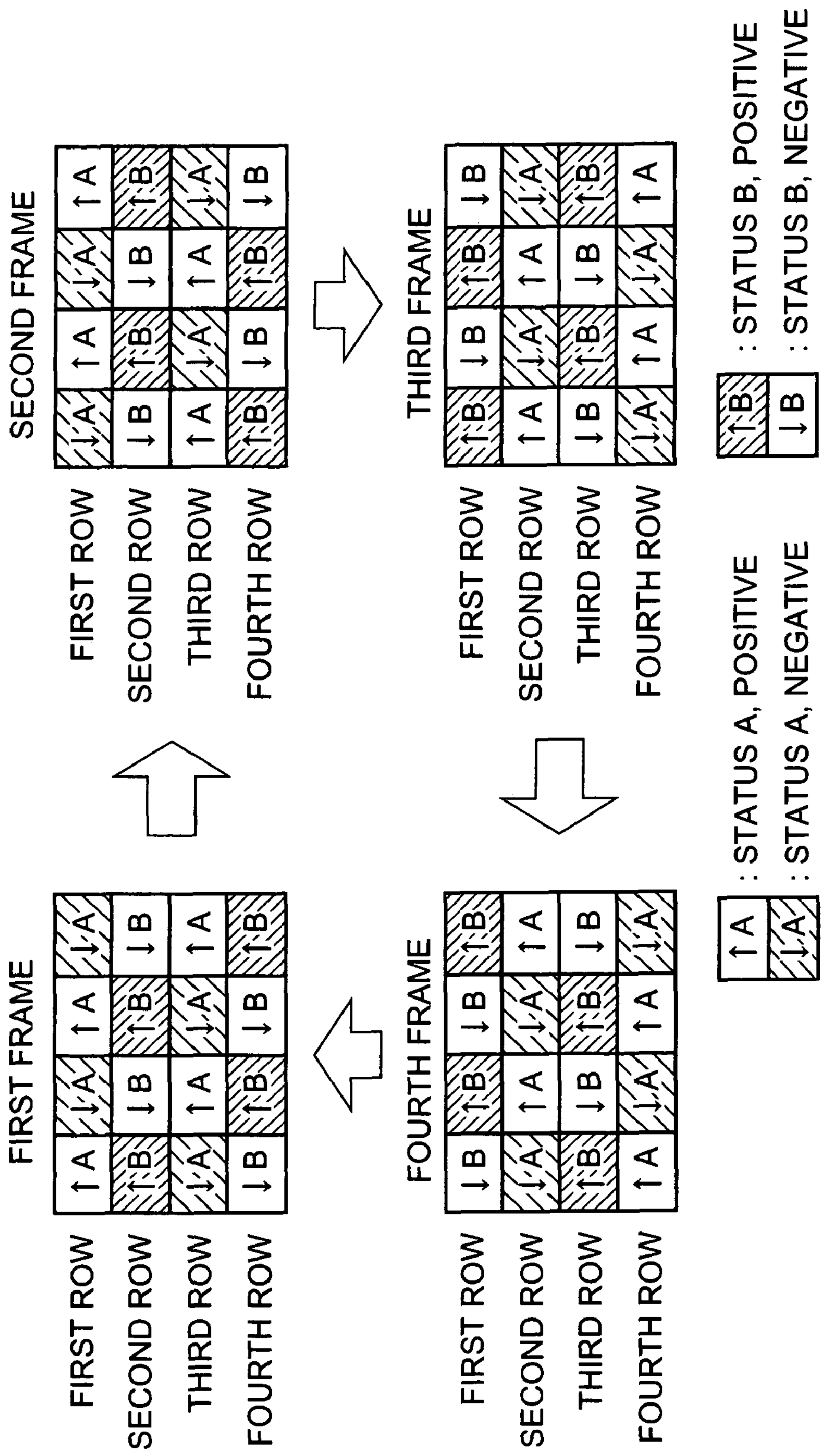
FIG. 8B shows the types of data signal to be supplied to pixels when driving in 2H inverted drive mode and when the offset cancel control signal is generated as shown in FIG. 7.

Now referring to FIG. 8B there are shown types of data signals to be supplied to pixels 13 when driving the LCD panel 1 in 1H inverted drive mode. It is to be understood that symbols "↑A", "↓A", "↑B", "↓B" are used therein in the similar manner to FIG. 2A, FIG. 2B, and FIG. 8A for the similar meaning.

As shown in FIG. 8B, when driving in 2H inverted drive mode, in each frame interval, the polarity of the data signal is inverted for every two horizontal lines and the status of the power amplifier 38 (i.e., the polarity of the offset voltage) is switched for every one horizontal line. According to such an operation, all four types of data signal as have been described above will appear in one row of pixels, four types of data signal are spatially evenly supplied, allowing effectively improving the image quality. For example, in the first frame interval, the types of data signal to be supplied to pixels in the leftmost row are "↑A", "↑B", "↓A", "↓B" sequentially in this order, thus four types of data signal appear at the leftmost pixel row. The reader will recognize easily that similarly in other frame intervals and in other pixel rows, all four types of data signal appears. It is to be noted that, in the operation shown in FIG. 8B, as similar to FIG. 8A, the polarity of the data signal is inverted in the horizontal direction for every one pixel (i.e., two pixels are taken as one cycle), therefore the dot inverted drive is in operation. In addition, the polarity of the data signal is inverted for every one frame interval, while the polarity of the offset voltage is inverted for every two frame intervals.

As can be appreciated from the foregoing description, in the preferred embodiment of the present invention, by selecting the spatial cycle to invert the polarity of the offset voltage by means of the pattern select signal PSEL, all four types of data signal as described above will appear in one pixel row in both 1H inverted drive mode and 2H inverted drive mode. By doing this four types of data signal are spatially evenly supplied, allowing effectively improving the image quality.

In the preferred embodiment as described above, the pattern select signal PSEL (or the value thereof) is supplied from an external source. The pattern select signal PSEL may be automatically generated internally in the source driver 3 in response to the polarity signal POL. As the polarity signal POL is a signal specifying the polarity of the data signal, which of 1H inverted drive and 2H inverted drive will be used may be detectable by checking to see the cycle of inversion of the polarity signal POL.

Figure 9:
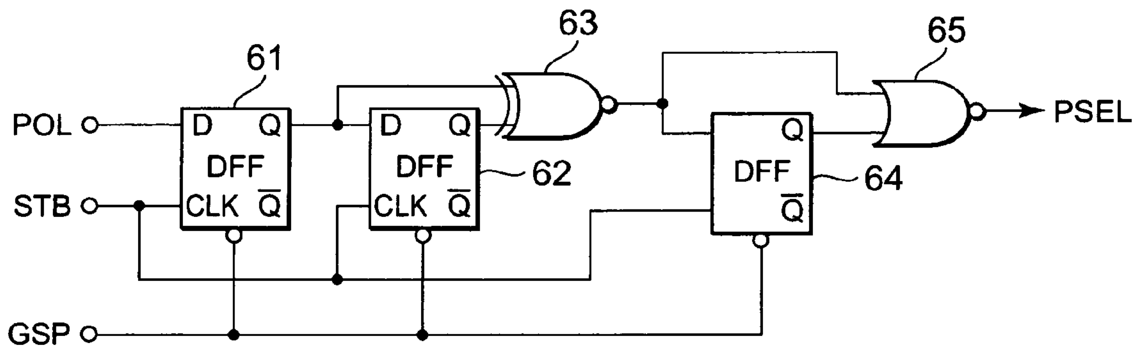
FIG. 9 shows a schematic circuit diagram illustrating an exemplary arrangement of a determination circuit for automatically generating a pattern select signal.

Now referring to FIG. 9 there is shown a schematic circuit diagram illustrating an exemplary determination circuit for determining which of 1H inverted drive and 2H inverted drive is in use and for generating the pattern select signal PSEL in response to the result of determination. The circuit shown in FIG. 9 includes D-flip-flops 61, 62 and 64, an XNOR gate 63, and an OR gate 65. The circuit of FIG. 9 supplies the strobe signal STB to the clock nodes of the D flip-flops 61, 62, 64, so that the D flip-flops 61, 62, 64 are set or reset at the start of every horizontal period. In addition, the gate start pulse signal GSP is supplied to the reset nodes of the D flip-flops 61, 62, 64 so that the D flip-flops 61, 62, 64 will be reset when each frame interval will have been started.

In the circuit shown in FIG. 9 the signal level of the polarity signal POL in the previous horizontal period is compared with the signal level of the polarity signal POL in the current horizontal period by the XNOR gate 63. When the signal level of the polarity signal POL in the previous horizontal period matches with that in the current horizontal period, then the output of the XNOR gate 63 will go to "high" level. The first input of the OR gate 65 is directly connected to the output of the XNOR gate 63 while the second input is connected to the output of the XNOR gate 63 through a D flip-flop 64, so that the output of the OR gate 65 will go to "high" level for two horizontal periods, each time the signal levels of the polarity signal POL are matched. Since in the 2H inverted drive, the signal levels of the polarity signal POL in the previous horizontal period and in the current horizontal period should match in every 2 horizontal periods, as the result of this the output of the OR gate 65 will be held to "high" level when driving in 2H inverted drive. On the other hand, when driving in 1H inverted drive operation, the signal levels of the polarity signal POL in the immediately previous horizontal period and in the current horizontal period should always differ, so that the output of the XNOR gate 63 will be held to "low" level, and eventually the output of the OR gate 65 will be also held to "low" level. As can be appreciated from the foregoing description, in the circuit of FIG. 9, the output signal of the OR gate 65 indicates which of 1H inverted drive and 2H inverted drive is in operation, thus may be used as the pattern select signal PSEL.

Figure 10:
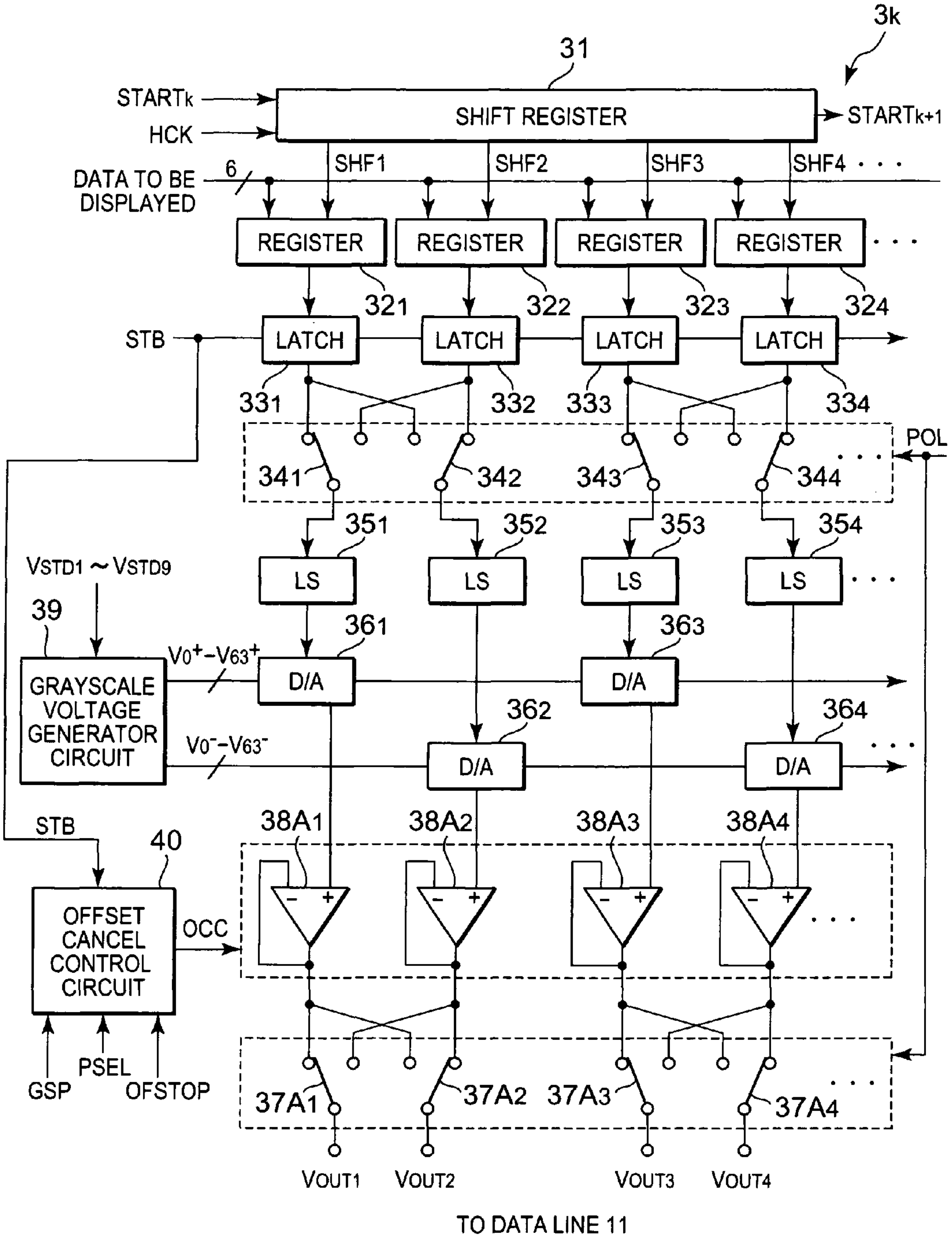
FIG. 10 shows a schematic block diagram illustrating another arrangement of the source driver according to the first preferred embodiment of the present invention.

In the configuration of the source driver 3 as shown in FIG. 4, the cross-switch 37 is interposed between the D/A converter 36 and the power amplifier 38, and the power amplifier 38 is directly connected to each output node Voutk. However, as shown in FIG. 10, it may be conceivable that the power amplifiers 38A1-38An are connected to the outputs of D/A converters 361-36n, and cross-switches 37A1-37An are interposed between the power amplifiers 38A1-38An and the output nodes Vout1-Voutk. In such a case a voltage follower may be used which is configured so as to generate only the data signal having the positive polarity for the odd number power amplifiers 38A2*i*−1, and a voltage follower may be used which is configured so as to generate only the data signal having the negative polarity for the even number power amplifiers 38A2*i*. In this configuration, the polarity of the offset voltage of the power amplifiers 38A1-38An will be inverted in response to the offset cancel control signal OCC.

Second Embodiment

Figure 11:
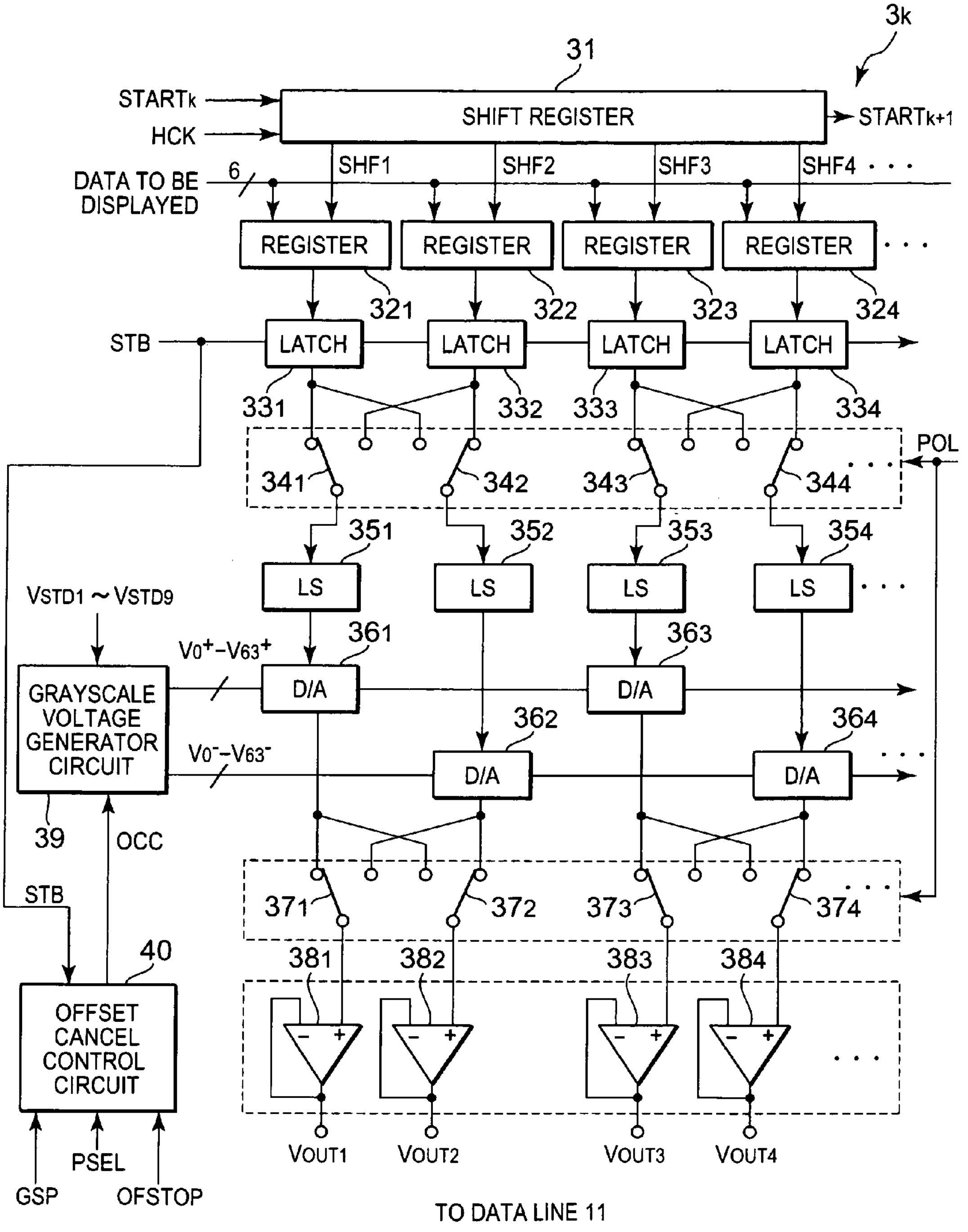
FIG. 11 shows a schematic block diagram illustrating an arrangement of the source driver according to the second preferred embodiment of the present invention.

Now referring to FIG. 11 there is shown a schematic block diagram illustrating the configuration of the source driver 3 used in a liquid crystal display device according to the second preferred embodiment of the present invention. In the present embodiment, the polarity of the offset voltage of the amplifier (gamma amplifier) for use in the generation of grayscale voltages V0+ to V63+, V0− to V63− in the grayscale voltage generator circuit 39. To perform such an operation as described above, the offset cancel control signal OCC is supplied to the grayscale voltage generator circuit 39, instead of the power amplifier 38.

Figure 12:
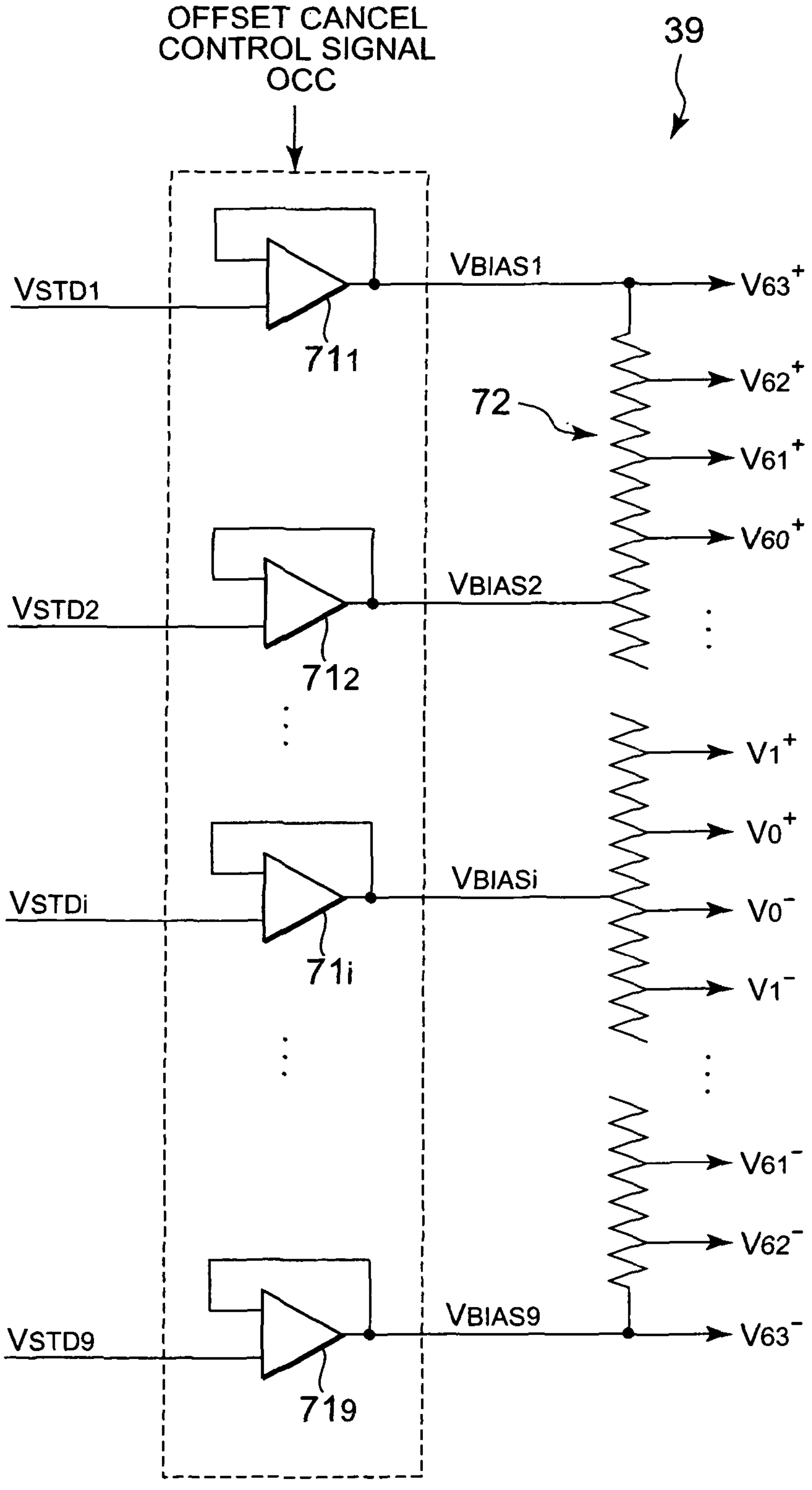
FIG. 12 shows a schematic block diagram illustrating an exemplary arrangement of a grayscale voltage generator circuit, which equips the source driver according to the second preferred embodiment of the present invention.

Now referring to FIG. 12 there is shown a schematic circuit diagram illustrating the arrangement of the grayscale voltage generator circuit 39. The grayscale voltage generator circuit 39 includes gamma amplifiers 711-719, and a resistance ladder 72. Each of the gamma amplifiers 711-719 receives from the grayscale power supply 5 the grayscale power supply voltage Vstd1-Vstd9 respectively to generate bias voltage Vbias1-Vbias9, respectively. For the gamma, amplifier 711-719, a voltage follower may be used, therefore the bias voltages Vbias1-Vbias9 have the same voltage level as the grayscale power supply voltage Vstd1-Vstd9 (except for the offset voltage). The outputs of the gamma amplifiers 711-719 are connected to input taps of the resistance ladder 72. The resistance ladder 72 divides the bias voltages Vbias1-Vbias9 supplied from the gamma amplifiers 711-719 by means of resistance to output the grayscale voltages V0+ to V63+ and V0− to V63− from their respective output tap.

Similar to the power amplifier 38 of the first embodiment, the gamma amplifiers 711-719 are configured to respond to the offset cancel control signal OCC to invert the polarity of the offset voltage. The amplifier of the configuration shown in FIG. 5A may be used for the gamma amplifiers 711-719.

The operation of the source driver 3 in the second preferred embodiment is same as that of the first preferred embodiment, except for that the polarity of the offset voltage of the gamma amplifiers 711-719 are inverted instead of that of the power amplifier 38. Also, in the second preferred embodiment, the offset cancel control signal OCC is generated in response to the pattern select signal PSEL, the offset cancel control signal OCC may be inverted at an appropriate cycle corresponding to the inversion cycle of the data signal. More specifically, the offset cancel control signal OCC will be inverted for every two horizontal lines in each frame interval when driving in 1H inverted drive mode, or will be inverted for everyone horizontal line in each frame interval when driving in 2H inverted drive mode. The polarity of the offset voltage of the gamma amplifier 71 may be therefore inverted at an appropriate cycle corresponding to the inversion cycle of the polarity of the data signal. According to such an operation, the deviation of the grayscale voltages V0+ to V63+, V0− to V63− from the desired value by the offset voltage of the gamma amplifiers 711-719 may be spatially equalized, allowing effectively improving the image quality.

In the present embodiment, although only the polarity of the offset voltage in the gamma amplifier 71 instead of the power amplifier 38 is inverted, the polarity of the offset voltage of both the power amplifier 38 and the gamma amplifier 71 may be inverted by supplying the offset cancel control signal OCC to both the power amplifier 38 and the gamma amplifier 71.

It is further understood by those skilled in the art that the foregoing description is preferred embodiments of the disclosed device and that various changes and modifications may be made in the invention without departing from the spirit and scope thereof.

What is claimed is:

1. A display device, comprising:

a display panel having a data line; and a source driver coupled to said panel, said source driver including a control circuit and an amplifier, said amplifier being coupled to said data line to supply a data signal with an offset voltage, said amplifier being responsive to a control signal from said control circuit to invert a polarity of said offset voltage, wherein said control circuit generates said control signal in response to a pattern select signal, a gate start pulse signal, and a strobe signal indicative of a cycle of inversion of the polarity of said offset voltage, wherein the source driver is configured to drive said display panel in a 2H inverted drive, wherein said polarity of said offset voltage of said amplifier during said 2H inverted drive is inverted for every one horizontal line in response to said pattern select signal, wherein the display device further comprises a gate driver for scanning gate lines in the display panel, wherein the gate start pulse signal is supplied to the gate driver for initiating the scan by the gate driver, wherein the source driver comprises:

- a plurality of registers sequentially receiving display data from an external source;
- a plurality of latches responsive to the strobe signal to latch the display data from the registers simultaneously; and
- a driver circuit for driving the data lines in response to the display data latched in the latch circuits, and wherein the control circuit comprises:

- a first divider circuit dividing the gate start pulse signal to generate ¼ divided gate start pulse signal;
- a second divider circuit dividing the strobe signal to generate ¼ divided strobe signal and ½ divided strobe signal;
- a first selector circuit in response to the pattern select signal to select either the ¼ divided strobe signal or the ½ divided strobe signal; and
- a second selector circuit in response to an output of the first selector circuit for outputting the ¼ divided gate start pulse signal or the inverted signal of the ¼ divided gate start pulse signal.

2. The display device according to claim 1, wherein the source driver is configured to drive said display panel in a 1H inverted drive and in said 2H inverted drive alternatively, and wherein said polarity of said offset voltage of said amplifier during the 1H inverted drive is inverted for every two horizontal lines in response to said pattern select signal.

3. The display device according to claim 1, wherein the source driver further includes a D/A converter supplied with a set of grayscale voltages to select and output one thereof based on display data, and wherein the amplifier includes a power amplifier coupled to receive the one grayscale voltage from the D/A converter to generate the data signal in response to the one grayscale voltage.

4. The display device according to claim 1, wherein the source driver further includes:

a grayscale voltage generator circuit;

a D/A converter supplied with a set of grayscale voltages from said generator circuit to select and output one thereof based on display data; and a power amplifier responsive to the selected grayscale voltage to generate the data signal, and wherein the amplifier includes a gamma amplifier integrated with the grayscale voltage generator circuit to cooperate to generate the set of grayscale voltages.

5. The display device according to claim 1, wherein the source driver further includes:

a grayscale voltage generator circuit; and a D/A converter supplied with a set of grayscale voltages from said generator circuit to select and output one thereof based on display data, and wherein the amplifier includes:

a power amplifier to generate the data signal based on the selected grayscale voltage; and a gamma amplifier integrated with the grayscale voltage generator circuit to generate the set of grayscale voltages.

6. The display device according to claim 1, wherein data indicative of the pattern select signal or a value of the pattern select signal is externally supplied to the source driver.

7. The display device according to claim 1, wherein a polarity signal is supplied to the source driver to specify a polarity of the data signal, and wherein the source driver includes a determining circuit responsive to said polarity signal to determine the cycle of inversion of the polarity of the data signal and to generate the pattern select signal in response to a result of the determination.

8. The display device according to claim 1, wherein said control circuit generates said control signal further in response to an offset cancel enable signal, said offset cancel enable signal comprising a signal that forbids a control on said inverting the polarity of the offset voltage.

9. The display device according to claim 8, wherein, when the offset cancel enable signal is at a first level, the control of the inverting the polarity of the offset voltage is allowed, and wherein, when the offset cancel enable signal is at a second level, said control signal is fixed such that the polarity of the offset voltage is not inverted.

10. The display device according to claim 1, wherein the gate start pulse signal inverts said control signal for a predetermined number of frame intervals, and wherein an activation of the gate start pulse signal indicates a start of each of said frame intervals.

11. The display device according to claim 10, wherein the strobe signal indicates a start of a horizontal period, the strobe signal inverting said control signal for a desired number of horizontal periods for said inverting the polarity of said offset voltage.

12. The display device according to claim 1, wherein the pattern select signal comprises a signal that specifies the cycle of inversion of the polarity of the offset voltage.

* * * * *